United States Patent
Sano et al.

(10) Patent No.: US 6,391,431 B1
(45) Date of Patent: May 21, 2002

(54) MAGNETORESISTANCE EFFECT FILM AND MAGNETORESISTANCE EFFECT TYPE HEAD

(75) Inventors: Masashi Sano; Yoshihiro Tsuchiya; Satoru Araki; Haruyuki Morita, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/325,394

(22) Filed: Jun. 4, 1999

(30) Foreign Application Priority Data

Jun. 30, 1998 (JP) .......................... 10-199801

(51) Int. Cl.$^7$ .............................. G11B 5/39
(52) U.S. Cl. ................ 428/213; 428/668; 428/680; 428/692; 428/216; 360/113
(58) Field of Search .................. 428/692, 611, 428/655, 670, 680, 668, 215, 332, 900, 694 T, 694 TM, 213, 216; 360/313, 113

(56) References Cited

U.S. PATENT DOCUMENTS

| | | | |
|---|---|---|---|
| 5,589,278 A | * 12/1996 | Kamijo | 428/611 |
| 5,608,593 A | 3/1997 | Kim et al. | |
| 5,716,719 A | * 2/1998 | Saito et al. | 428/611 |
| 5,768,067 A | * 6/1998 | Saito et al. | 360/113 |
| 5,862,022 A | 1/1999 | Noguchi et al. | |
| 5,942,309 A | * 8/1999 | Kamijo | 428/141 |
| 6,090,480 A | * 7/2000 | Hayashi | 428/332 |
| 6,090,498 A | * 7/2000 | Omata et al. | 428/692 |
| 6,153,062 A | * 11/2000 | Saito et al. | 204/192.2 |

FOREIGN PATENT DOCUMENTS

JP 9-63021 3/1997

* cited by examiner

Primary Examiner—Stevan A. Resan
Assistant Examiner—Kevin M. Bernatz
(74) Attorney, Agent, or Firm—Oblon, Spivak, McClelland, Maier & Neustadt, P.C.

(57) ABSTRACT

A spin valve type magnetoresistance effect film comprises a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from the other surface thereof abutting the non-magnetic metal layer so as to pin a direction of magnetization of the ferromagnetic layer, and an antiferromagnetization promote layer formed on a surface of the antiferromagnetic layer remote from the other surface thereof abutting the ferromagnetic layer, wherein the antiferromagnetic layer is made of a compound containing Mn and having a CuAu-I type regular crystal structure the which requires a heat treatment for generating exchange coupling relative to the ferromagnetic layer, and the antiferromagnetic layer after the heat treatment has a state wherein (110) crystal surfaces are oriented on a film surface of the antiferromagnetic layer.

48 Claims, 11 Drawing Sheets

MAGNETORESISTANCE EFFECT FILM AND MAGNETORESISTANCE EFFECT TYPE HEAD

BACKGROUND OF THE INVENTION

1. Field of the Invention

The present invention relates to a magnetoresistance effect film for reading the magnetic field intensity of a magnetic recording medium or the like as a signal and, in particular, to a magnetoresistance effect film which is capable of reading a small magnetic field change as a greater electrical resistance change signal, and further relates to a magnetoresistance effect type head using such a magnetoresistance effect film. They are mainly incorporated in, for example, hard disk drives so as to be used.

2. Description of the Prior Art

Recently, following the high densification of hard disks, highly-sensitive heads with high outputs have been demanded. In response to these demands, spin valve heads have been developed.

The spin valve head has a structure wherein two ferromagnetic layers are formed via a non-magnetic metal layer, and an antiferromagnetic layer is disposed so as to abut one of the ferromagnetic layers. The ferromagnetic layer abutting the antiferromagnetic layer is in exchange coupling to the antiferromagnetic layer so that the magnetization of the ferromagnetic layer is fixed (pinned) in one direction. The magnetization of the other ferromagnetic layer is freely rotated following the change of the external magnetic field. In the spin valve, the MR change is realized by a difference in relative angles of spins between the two ferromagnetic layers. Therefore, the exchange coupling between the antiferromagnetic layer and the ferromagnetic layer abutting it can be thought as the substance of the spin valve.

As a material of an antiferromagnetic layer used in the spin valve, FeMn, NiMn, PtMn, PtPdMn or the like has been known.

When FeMn is used as the antiferromagnetic layer, the exchange coupling is generated relative to the ferromagnetic layer immediately after the formation of a film. Thus, a heat treatment for generating the exchange coupling is not required after the film formation. However, there is raised a limitation in order of the film formation that the antiferromagnetic layer should be formed after the formation of the ferromagnetic layer. Further, when FeMn is used, there is a problem that a blocking temperature is low, i.e. about 150 to 170° C. The blocking temperature is a temperature at which the exchange coupling pinning a magnetic layer is lost.

On the other hand, when NiMn, PtMn or PtPdMn is used as the antiferromagnetic layer, the blocking temperature is high, i.e. no lower than 300° C., and further, there is no limitation in order of the formation of the antiferromagnetic layer and the ferromagnetic layer. However, for generating the exchange coupling between the antiferromagnetic layer and the ferromagnetic layer, a heat treatment is required in the magnetic field after stacking both layers. This is because, for NiMn, PtMn or PtPdMn to exhibit the antiferromagnetism, a CuAu-I type regular crystal structure having a face centered tetragonal (FCT) structure needs to be formed. The heat treatment in the magnetic field is normally carried out under a temperature condition of 250 to 350° C. The degree of exchange coupling tends to be increased as the temperature is raised. However, if the heat treatment at high temperatures is applied to the spin valve film, a magnetoresistance change ratio (MR ratio) being an important film characteristic of the spin valve film is lowered. Therefore, it is desired that the heat treatment for generating the exchange coupling between the antiferromagnetic layer and the ferromagnetic layer abutting it be carried out at as low a temperature as possible which can achieve the exchange coupling to a given level. Accordingly, proposal for a laminate film structure has been demanded which can realize it.

On the other hand, in case of forming the CuAu-I type regular crystal structure through the heat treatment for manifesting the antiferromagnetism of NiMn, PtMn or PtPdMn, it has been considered the optimum condition for obtaining an excellent antiferromagnetic characteristic that (111) crystal surfaces are oriented on the film surface of the antiferromagnetic layer. Specifically, it has been considered among persons skilled in the art that the (111) crystal surface is the best orientation of the antiferromagnetic layer having the CuAu-I type regular crystal structure. In fact, the literature of Japan Applied Magnetism Institution Journal Vol. 22, No. 4-2, pp 501–504 (1998) as the prior art has also confirmed this fact. Specifically, according to the literature, it has been reported that by (111) orienting the PtPdMn antiferromagnetic layer, the anisotropic energy of the PtPdMn antiferromagnetic layer is increased to increase Hua (shift magnetic field).

However, for obtaining a better spin valve film characteristic, it is important to look at the crystal orientation of the antiferromagnetic layer again from the starting point, not based on such a ready-made idea.

The present invention has been made under these circumstances and has an object to provide a magnetoresistance effect film and a magnetoresistance effect type head which are large in exchange coupling energy between a ferromagnetic layer and an antiferromagnetic layer, large in MR ratio and highly excellent in spin valve film characteristic when NiMn or PtMn or an alloy of them is used as the antiferromagnetic layer thereof.

As the prior art literature relevant to the present invention, there are U.S. Pat. No. 5,608,593 and JP-A-9-63021.

U.S. Pat. No. 5,608,593 discloses a spin valve film having a structure wherein a buffer layer made of Cu or NiCr, an antiferromagnetic layer made of FeMn, NiMn or NiCoO and a ferromagnetic layer pinned by the antiferromagnetic layer are formed in the order named on an under layer formed on a substrate. The buffer layer is described to have an adequate microstructure and functions of promoting a phase of the antiferromagnetic layer and preventing mutual diffusion between the under layer and the antiferromagnetic layer. However, only by a simple combination of the buffer layer made of Cu and the antiferromagnetic layer made of NiMn, the foregoing object of the present invention can not be accomplished to a sufficient level.

On the other hand, JP-A-9-63021 discloses a spin valve film having a structure wherein a film obtained by stacking Ta and NiFe is used as an under layer, and an antiferromagnetic layer made of NiMn and a ferromagnetic layer pinned by the antiferromagnetic layer are formed in the order named on the under layer. It is described that Ta of the under layer is used for smoothing the surface, while NiFe of the under layer is used for allowing NiMn to easily form an FCT structure. However, even if the intermediate layer made of NiFe is used as a layer abutting the antiferromagnetic layer, the foregoing object of the present invention can not be accomplished to a sufficient level.

SUMMARY OF THE INVENTION

For solving the foregoing problems, according to one aspect of the present invention, there is provided a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from the other surface thereof abutting the non-magnetic metal layer so as to pin a direction of magnetization of the ferromagnetic layer, and an antiferromagnetization promote layer formed on a surface of the antiferromagnetic layer remote from the other surface thereof abutting the ferromagnetic layer, wherein the antiferromagnetic layer is made of a compound containing Mn and having a CuAu-I type regular crystal structure, the antiferromagnetic layer has a characteristic requiring a heat treatment for generating exchange coupling relative to the ferromagnetic layer, and the antiferromagnetic layer after the heat treatment has a state wherein (110) crystal surfaces are oriented on a film surface of the antiferromagnetic layer.

According to another aspect of the present invention, there is provided a magnetoresistance effect type head comprising a magnetoresistance effect film, conductive films and electrode portions, wherein the conductive films are conductively connected to the magnetoresistance effect film through the electrode portions, wherein the magnetoresistance effect film is a spin valve type magnetoresistance effect film which comprises a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from the other surface thereof abutting the non-magnetic metal layer so as to pin a direction of magnetization of the ferromagnetic layer, and an antiferromagnetization promote layer formed on a surface of the antiferromagnetic layer remote from the other surface thereof abutting the ferromagnetic layer, and wherein the antiferromagnetic layer is made of a compound containing Mn and having a CuAu-I type regular crystal structure, the antiferromagnetic layer has a characteristic requiring a heat treatment for generating exchange coupling relative to the ferromagnetic layer, and the antiferromagnetic layer after the heat treatment has a state wherein (110) crystal surfaces are oriented on a film surface of the antiferromagnetic layer.

It is preferable that the antiferromagnetic layer is made of PtMn, and that a value of $I_0/I_1$ is set in the range of 0.3 to 10, the $I_0$ representing an X-ray diffraction intensity exhibiting (110) crystal orientation surfaces on the film surface of the antiferromagnetic layer and the $I_1$ representing an X-ray diffraction intensity exhibiting (111) crystal orientation surfaces on the film surface of the antiferromagnetic layer.

It is preferable that the antiferromagnetic layer is made of $Pt_{x1}M_{y1}Mn_{z1}$ wherein M represents at least one selected from Ru, Rh, Pd, Au, Ag, Fe and Cr, $30 \leq x1 \leq 60$, $0 \leq y1 \leq 30$, $40 \leq z1 \leq 60$, and the unit of x1, y1 and z1 is atomic %, and that a value of $I_0/I_1$ is set in the range of 0.3 to 10, the $I_0$ representing an X-ray diffraction intensity exhibiting (110) crystal orientation surfaces on the film surface of the antiferromagnetic layer and the $I_1$ representing an X-ray diffraction intensity exhibiting (111) crystal orientation surfaces on the film surface of the antiferromagnetic layer.

It is preferable that the value of $I_0/I_1$ with respect to the PtMn antiferromagnetic layer is set in the range of 1 to 10.

It is preferable that the antiferromagnetic layer is made of NiMn, and that a value of $I_0/I_1$ is set in the range of 0.01 to 5, the $I_0$ representing an X-ray diffraction intensity exhibiting (110) crystal orientation surfaces on the film surface of the antiferromagnetic layer and the $I_1$ representing an X-ray diffraction intensity exhibiting (111) crystal orientation surfaces on the film surface of the antiferromagnetic layer.

It is preferable that the antiferromagnetic layer is made of $Ni_{x2}M_{y2}Mn_{z2}$ wherein M represents at least one selected from Ru, Rh, Pd, Pt, Au, Ag, Fe and Cr, $30 \leq x2 \leq 60$, $0 \leq y2 \leq 30$, $40 \leq z2 \leq 60$, and the unit of x2, y2 and z2 is atomic %, and that a value of $I_0/I_1$ is set in the range of 0.01 to 5, the $I_0$ representing an X-ray diffraction intensity exhibiting (110) crystal orientation surfaces on the film surface of the antiferromagnetic layer and the $I_1$ representing an X-ray diffraction intensity exhibiting (111) crystal orientation surfaces on the film surface of the antiferromagnetic layer.

It is preferable that the value of $I_0/I_1$ with respect to the NiMn antiferromagnetic layer is set in the range of 0.1 to 5.

It is preferable that the antiferromagnetization promote layer is made of at least one selected from W, Mo, V, Cr and Ta.

It is preferable that the antiferromagnetization promote layer is made of at least one selected from W, Mo and V.

It is preferable that an adjustment between a thickness o of the antiferromagnetic layer and a thickness of the antiferromagnetization promote layer is carried out for providing the state wherein the (110) crystal surfaces are oriented on the film surface of the antiferromagnetic layer, and that a value of Tan/Tpr is set in the range of 6 to 12, the Tan representing the thickness of the antiferromagnetic layer and the Tpr representing the thickness of the antiferromagnetization promote layer.

It is preferable that the Tan is set in the range of 5 to 30 nm.

It is preferable that the magnetoresistance effect film comprises a laminate structure formed by the antiferromagnetization promote layer, the antiferromagnetic layer, the ferromagnetic layer, the non-magnetic metal layer and the soft magnetic layer which are stacked in the order named on a substrate directly or via an under layer.

DETAILED DESCRIPTION OF THE INVENTION

Hereinbelow, the concrete carrying-out modes of the present invention will be described in detail.

Figure 1:
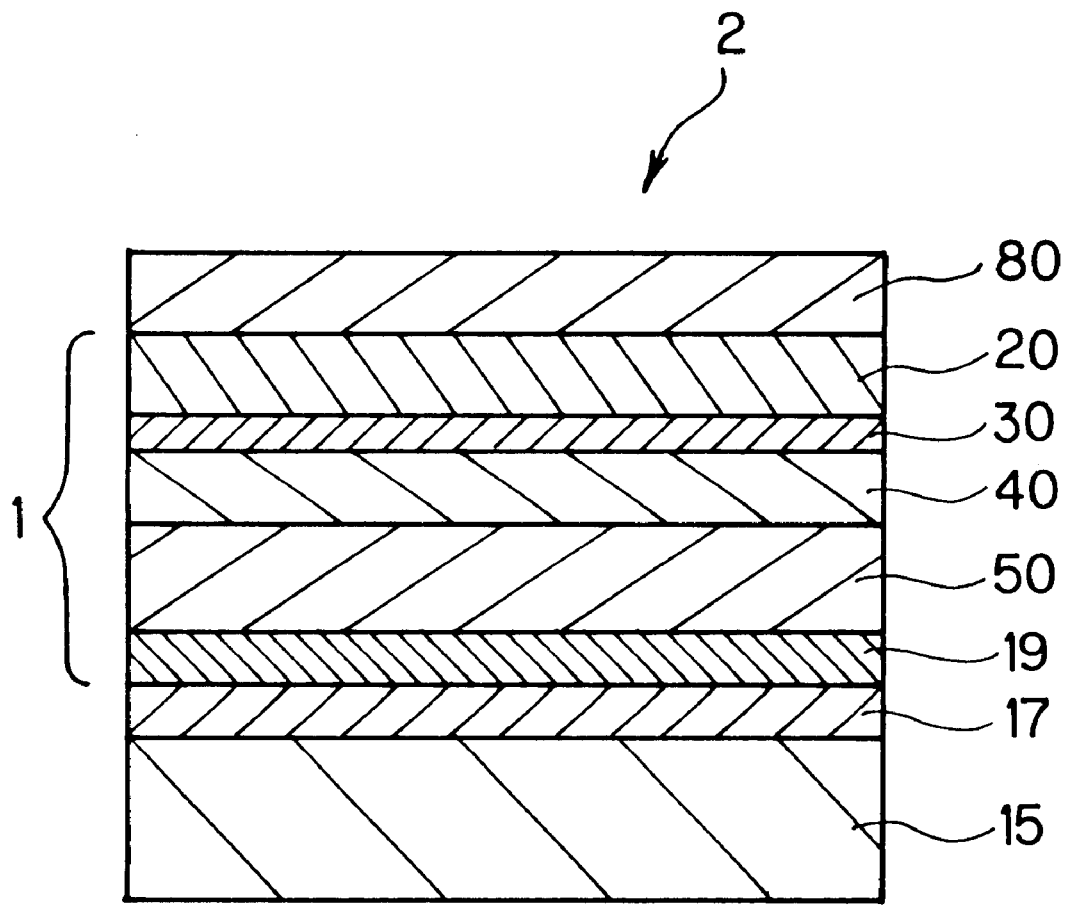
FIG. 1 is a sectional view showing a magnetoresistance effect film according to the present invention.

FIG. 1 is a sectional view showing a preferred example of a magnetoresistance effect film 2. In this carrying-out mode, the magnetoresistance effect film 2 has a magnetic multilayered film 1 as a spin valve film showing a giant magnetoresistance effect.

As shown in FIG. 1, the magnetic multilayered film 1 has a laminate body structure which comprises a non-magnetic metal layer 30, a ferromagnetic layer 40 formed on one surface of the non-magnetic metal layer 30, a soft magnetic layer 20 formed on the other surface of the non-magnetic metal layer 30, an antiferromagnetic layer 50 which is formed on a surface of the ferromagnetic layer 40 remote from the other surface thereof abutting the non-magnetic metal layer 30 so as to pin the direction of magnetization of the ferromagnetic layer 40, and an antiferromagnetization promote layer 19 which is formed on a surface of the antiferromagnetic layer 50 remote from the other surface thereof abutting the ferromagnetic layer 40.

In the preferred carrying-out mode shown in FIG. 1, the laminate body is formed on a substrate 15, and they are laminated from the side of the substrate 15 via an under layer 17 in the order of the antiferromagnetization promote layer 19, the antiferromagnetic layer 50, the ferromagnetic layer 40, the non-magnetic metal layer 30 and the soft magnetic layer 20. As shown in the drawing, a protective layer 80 is further formed on the soft magnetic layer 20.

In the magnetic multilayered film 1 (spin valve film) according to this carrying-out mode, it is required that the soft magnetic layer 20 and the ferromagnetic layer 40 which are adjacently formed at both sides of the non-magnetic metal layer 30 have substantially different magnetization directions from each other in accordance with a signal magnetic field applied from the external. The reason is as follows: In the principle of the present invention, when the magnetization directions of the soft magnetic layer 20 and the ferromagnetic layer 40 which are formed via the non-magnetic metal layer 30 interposed therebetween are deviated from each other, conduction electrons have a behavior of scattering due to spins to increase its resistance. In this case, when the magnetization directions are opposite to each other, the maximum resistance is obtained. That is, in this invention, when a signal magnetic field from the external is positive (in an upward direction with respect to a recording surface 93 of a recording medium 90 (represented by reference numeral 92)) as shown in FIG. 2, there occur mutually opposite components in the magnetization directions of the neighboring magnetic layers so that the resistance is increased.

Here, the relationship among the external signal magnetic field from the magnetic recording medium, the magnetization directions of the soft magnetic layer 20 and the ferromagnetic layer 40 and the variation of electrical resistance in the (spin valve) magnetic multilayered film used in the magnetoresistance effect film of the present invention will be described.

Now, in order to facilitate the understanding of the present invention, the simplest magnetic multilayered film in which the pair of soft magnetic layer 20 and ferromagnetic layer 40 exist via the non-magnetic metal layer 30 as shown in FIG. 1 will be described with reference to FIG. 2.

Figure 2:
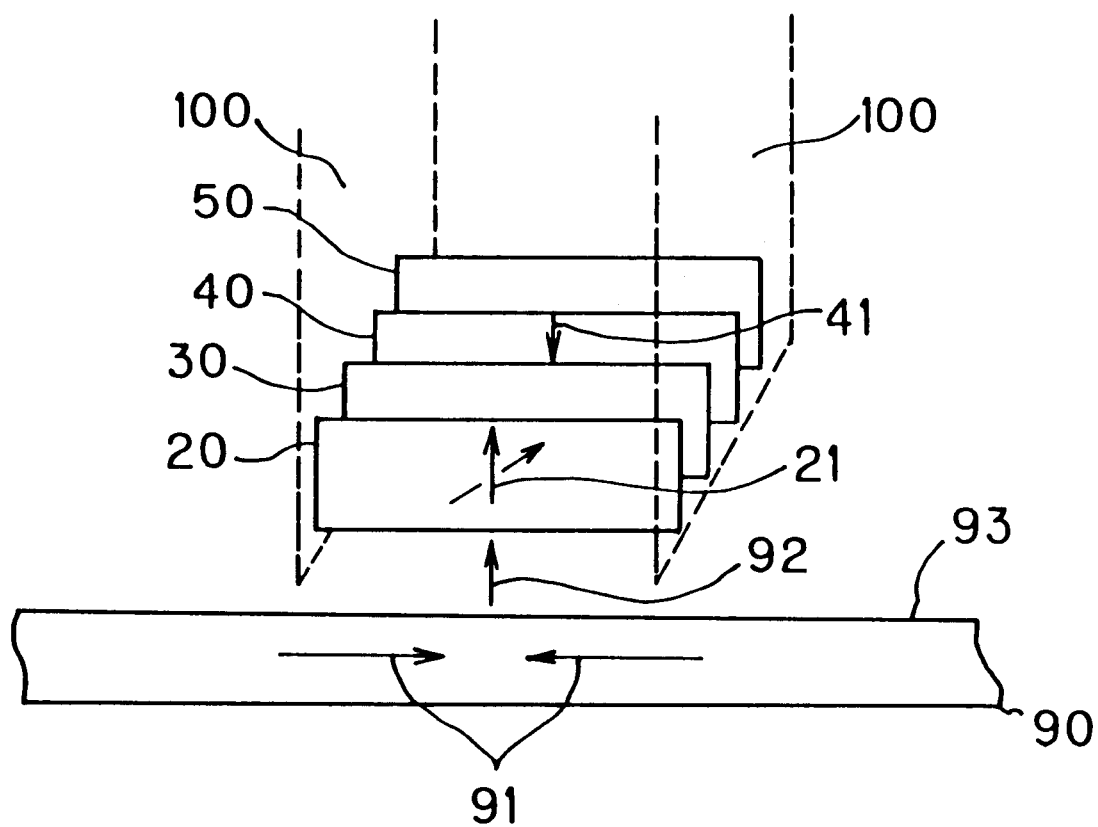
FIG. 2 is a schematic diagram showing a magnetoresistance effect film, particularly, a structure of a magnetic multilayered film, for explaining an operation of the present invention.

As shown in FIG. 2, the magnetization of the ferromagnetic layer 40 is pinned in a downward direction to the surface of the recording medium by a method as described later (see reference numeral 41). The soft magnetic layer 20 is formed via the non-magnetic metal layer 30 so that the magnetization direction thereof is varied in accordance with the signal magnetic field from the external (see reference numeral 21). At this time, the relative angle between the magnetization directions of the soft magnetic layer 20 and the ferromagnetic layer 40 is greatly varied in accordance with the direction of the signal magnetic field from the magnetic recording medium 90. As a result, the scattering degree of the conduction electrons flowing in the magnetic layers is varied, and thus the electrical resistance is greatly varied.

Accordingly, a large MR (Magneto-Resistance) effect, which essentially differs in mechanism from the anisotropic magnetoresistance effect of Permalloy, can be obtained. This is particularly called a GMR (Giant-Magneto-Resistance) effect.

Figure 3:
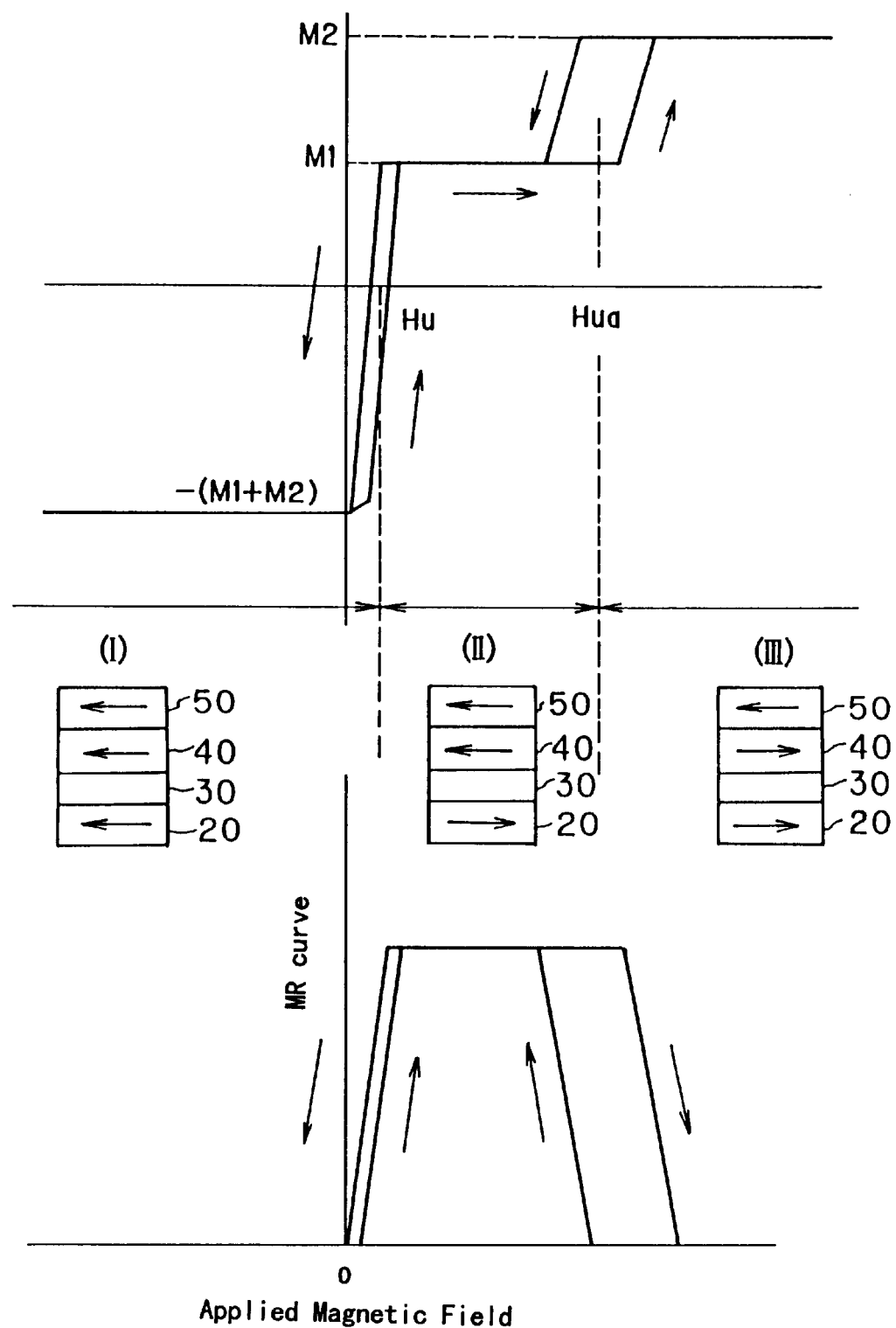
FIG. 3 is a schematic diagram showing a magnetization curve and an MR curve for explaining an operation of the present invention.

The magnetization directions of the soft magnetic layer 20, the ferromagnetic layer 40 and the antiferromagnetic layer 50 exhibiting a pinning effect are varied relative to the external magnetic field. The variation of the magnetization directions thereof is shown in FIG. 3 in correspondence with the magnetization curve and the MR curve. In this case, all the magnetization of the ferromagnetic layer 40 is fixed in a minus direction (in a downward direction with respect to the recording surface of the recording medium 90) by the antiferromagnetic layer 50. When the external signal magnetic field is minus, the magnetization of the soft magnetic layer 20 is also in the minus direction. Now, it is assumed that the coercive force of each of the soft magnetic layer 20 and the ferromagnetic layer 40 is approximate to zero in order to simplify the description. In an area (I) where the signal magnetic field H<0, the magnetization of both the soft magnetic layer 20 and the ferromagnetic layer 40 is oriented in one direction.

When the external magnetic field is intensified and H exceeds the coercive force of the soft magnetic layer 20, the magnetization direction of the soft magnetic layer is rotated in the direction of the signal magnetic field, so that the magnetization and the electrical resistance are increased as the magnetization directions of the soft magnetic layer 20 and the ferromagnetic layer 40 become antiparallel to each other. Finally, these values are fixed (state of an area (II)). At this time, a pinning magnetic field Hua is applied by the antiferromagnetic layer 50. If the signal magnetic field exceeds Hua, the magnetization of the ferromagnetic layer 40 is also rotated in the direction of the signal magnetic field, so that the magnetization of each of the soft magnetic layer 20 and the ferromagnetic layer 40 is oriented in the same direction in an area (III). At this time, the magnetization is set to a constant value, and the MR curve is equal to zero.

Conversely, when the signal magnetic field H is reduced, the magnetization is changed from the area (III) through the area (II) to the area (I) by inversion of the magnetization of the soft magnetic layer 20 and the ferromagnetic layer 40 in the same manner as described above. At an initial portion of the area (II), conduction electrons have a behavior of scattering dependent on spins, and the resistance is increased. In the area (II), the ferromagnetic layer 40 has little magnetization inversion because it is pinned, while the magnetization of the soft magnetic layer 20 increases linearly, so that the rate of spin-dependent scattered conduction electrons is gradually increased in accordance with the magnetization change of the soft magnetic layer 20. That is, if $Ni_{0.8}Fe_{0.2}$ whose Hc is low is selected for the soft magnetic layer 20 and a suitable unidirectional anisotropic magnetic field Hk is applied, a formed magnetic multilayered film has a linearly-varying resistance and a large magnetoresistance ratio in a small external magnetic field of several Oe to several tens Oe below Hk.

Hereinbelow, each constitution of the foregoing magnetoresistance effect film 2 will be described in detail. The first feature of this magnetoresistance effect film resides in that the antiferromagnetic layer 50 is made of a compound containing Mn and having a CuAu-I type regular crystal structure, that the antiferromagnetic layer 50 has a characteristic requiring a heat treatment for generating the exchange coupling relative to the ferromagnetic layer 40, and that the antiferromagnetic layer 50 after the heat treatment has a state wherein (110) crystal surface are oriented on the film surface thereof. The CuAu-I type regular crystal structure is described in "Magnetic Body Handbook (Asakura Bookstore), pp. 401 to 403" and defined as, for example, a crystal structure of PtMn, NiMn or PtPdMn.

For the compound containing Mn and having the CuAu-I type regular crystal structure to obtain an excellent antiferromagnetic characteristic, it has been considered best to orient the (111) crystal surfaces on the film surface of the antiferromagnetic layer 50. The present invention has been made from an aspect quite different from such a conventional idea. Specifically, it is essential in the present invention that although the (111) crystal surfaces may exist on the film surface of the antiferromagnetic layer 50, the (110) crystal surfaces are invariably oriented at a given rate.

The present inventors have studied the orientation rates of the (110) crystal surfaces and found that the optimum ranges thereof are different between (i) antiferromagnetic layers 50 made of PtMn materials and (ii) antiferromagnetic layers 50 made of NiMn materials. Hereinbelow, the orientation rates of the (110) crystal surfaces with respect to the PtMn materials and the NiMn materials will be described in detail.

(i) Antiferromagnetic Layers 50 Made of PtMn Group Materials

A typical composition which is most preferable as a PtMn group material is PtMn. On the film surface thereof, there exist crystals oriented on the (110) surfaces and crystals oriented on the (111) surfaces. The rate of crystal orientation on the (110) surfaces on the film surface is set in terms of the X-ray diffraction intensity ratio. Specifically, assuming that an X-ray diffraction intensity showing the (110) crystal orientation surfaces is set to $I_0$ and an X-ray diffraction intensity showing the (111) crystal orientation surfaces is set to $I_1$ on the film surface of the antiferromagnetic layer 50 made of PtMn, a value of the ratio $(I_0/I_1)$ is set to no less than 0.3, particularly in the range of 0.3 to 10, preferably in the range of 1 to 10, more preferably in the range of 3 to 10, and further preferably in the range of 5 to 10.

If the value of $I_0/I_1$ becomes less than 0.3, particularly near less than 0.3, the (110) surface crystal orientation rate becomes small so that the exchange coupling energy which is so excellent as to exceed the conventional expectation can not be obtained and thus an excellent spin valve film can not be formed. Although it is considered that there is no particular upper limit to the value of $I_0/I_1$, when synthetically judging it in view of the current film formation technique etc., it is adequate to judge that the value of 10 is the upper limit.

As other preferable PtMn group materials, those materials represented by $Pt_{x1}M_{y1}Mn_{z1}$ can be cited wherein M represents at least one selected from Ru, Rh, Pd, Au, Ag, Fe and Cr, preferably Ru or Rh. The range of x1 is set to $30 \leq x1 \leq 60$, the range of y1 is set to $0 \leq y1 \leq 30$, the range of z1 is set to $40 \leq z1 \leq 60$, and the unit of x1, y1 and z1 is atomic %. Even in case of the material represented by $Pt_{x1}M_{y1}Mn_{z1}$, the rate of crystal orientation on the (110) surfaces on the film surface thereof is the same as that in case of the foregoing PtMn, i.e. the value of $I_0/I_1$ is set to no less than 0.3, particularly in the range of 0.3 to 10, preferably in the range of 1 to 10, more preferably in the range of 3 to 10, and further preferably in the range of 5 to 10.

(ii) Antiferromagnetic Layers 50 Made of NiMn Group Materials

A typical composition which is most preferable as a NiMn material is NiMn. On the film surface thereof, there exist crystals oriented on the (110) surfaces and crystals oriented on the (111) surfaces. The rate of crystal orientation on the (110) surfaces on the film surface is set in terms of the X-ray diffraction intensity ratio.

Specifically, assuming that an X-ray diffraction intensity showing the (110) crystal orientation surfaces is set to $I_0$ and an X-ray diffraction intensity showing the (111) crystal orientation surfaces is set to $I_1$ on the film surface of the antiferromagnetic layer 50 made of NiMn, a value of the ratio $(I_0/I_1)$ is set to no less than 0.01, particularly in the range of 0.01 to 5, preferably in the range of 0.1 to 5, more preferably in the range of 0.4 to 5, and further preferably in the range of 1 to 5.

If the value of $I_0/I_1$ becomes less than 0.01, particularly near less than 0.01, the (110) surface crystal orientation rate becomes small so that the exchange coupling energy which is so excellent as to exceed the conventional expectation can not be obtained and thus an excellent spin valve film can not be formed. Although it is considered that there is no particular upper limit to the value of $I_0/I_1$, when synthetically judging it in view of the current film formation technique etc., it is adequate to judge that the value of 5 is the upper limit.

As other preferable NiMn group materials, those materials represented by $Ni_{x2}M_{y2}Mn_{z2}$ can be cited wherein M represents at least one selected from Ru, Rh, Pd, Pt, Au, Ag, Fe and Cr, preferably Ru, Rh or Pd. The range of x2 is set to $30 \leq x2 \leq 60$, the range of y2 is set to $0 \leq y2 \leq 30$, the range of z2 is set to $40 \leq z2 \leq 60$, and the unit of x2, y2 and z2 is atomic %. Even in case of the material represented by $Ni_{x2}M_{y2}Mn_{z2}$, the rate of crystal orientation on the (110) surfaces on the film surface thereof is the same as that in case of the foregoing NiMn, i.e. the value of $I_0/I_1$ is set to no less than 0.01, particularly in the range of 0.01 to 5, preferably in the range of 0.1 to 5, more preferably in the range of 0.4 to 5, and further preferably in the range of 1 to 5.

The second feature in the present invention resides in a combination of a material constituting the antiferromagnetic layer 50 and a material constituting the antiferromagnetization promote layer 19 formed on a surface of the antiferromagnetic layer 50 remote from the other surface thereof abutting the ferromagnetic layer 40.

Specifically, in the present invention, as described above, the antiferromagnetic layer 50 is made of the compound containing Mn and having the CuAu-I type regular crystal structure. With the presence of the later-described antiferromagnetization promote layer 19, the antiferromagnetic layer 50 is subjected to a heat treatment for generating the exchange coupling relative to the ferromagnetic layer 40. Through the heat treatment, the regular crystals forming the antiferromagnetic layer 50 are oriented on the (110) surfaces at the foregoing given rate.

In the present invention, the antiferromagnetization promote layer 19 is made of at least one selected from, for example, W, Mo, V, Cr and Ta. Among them, W, Mo and V are particularly preferable. By providing such an antiferromagnetization promote layer 19, the (110) surface crystal orientation of the antiferromagnetic layer 50 is facilitated so that the crystal rate of the (110) surface orientation can be adjusted by a certain degree. Further, the exchange coupling between the antiferromagnetic layer 50 and the ferromagnetic layer 40 can be achieved at a relatively low heat treatment temperature (e.g. no higher than 250° C., particularly 220 to 250° C.). Specifically, the regularization temperature can be lowered so that deterioration in characteristic of the laminate film due to mutual diffusion can be prevented as much as possible.

Further, for easily realizing the state wherein the (110) crystal surfaces are oriented on the film surface of the antiferromagnetic layer 50, it is preferable to perform an adjustment between the thickness of the antiferromagnetic layer 50 and the thickness of the antiferromagnetization promote layer 19 made of the foregoing material, i.e. perform film thickness matching for the (110) crystal surface orientation. Specifically, given that the thickness of the antiferromagnetic layer 50 is Tan and the thickness of the antiferromagnetization promote layer 19 is Tpr, a value of the ratio (Tan/Tpr) is set to 6 to 12, preferably 7 to 12, and more preferably 8 to 12. Within these film thickness ratio ranges, the (110) crystal surface orientation can be easily realized.

The thickness Tan of the antiferromagnetic layer 50 is set to 5 to 30 nm, more preferably 5 to 20 nm. If the thickness of the antiferromagnetic layer 50 becomes smaller than 5 nm, the exchange coupling magnetic field Hua and the blocking temperature are rapidly reduced. On the other hand, in case of being thicker, it is not so serious. However, if it is too thick, a gap length (a shield-shield length) of the MR head is so increased that it is not suitable for the ultrahigh density magnetic recording. Thus, it is preferably less than 30 nm.

In the present invention, it is preferable that the concentration of oxygen contained in the antiferromagnetic layer 50 is regulated to 1 to 2,000 atomic ppm, preferably 1 to 1,000 atomic ppm, and more preferably 1 to 600 atomic ppm. If this value exceeds 2,000 atomic ppm, there is raised a tendency that a large value of energy Jk of exchange coupling between the antiferromagnetic layer 50 and the ferromagnetic layer 40 can not be obtained. It is preferable that the lower limit of the oxygen concentration is as close to zero as possible. However, since it is practically impossible to realize zero, 1 atomic ppm is regulated as a general standard of the lower limit.

Further, in the present invention, the antiferromagnetic layer 50 may further contain carbon, sulfur and chlorine as impurities. It is preferable that the concentration of carbon contained in the antiferromagnetic layer 50 is set to 1 to 2,000 atomic ppm, the concentration of sulfur to 1 to 1,000 atomic ppm, and the concentration of chlorine to 1 to 2,000 atomic ppm. If the upper limits of those impurity concentration ranges are exceeded, there is raised a tendency that a large value of energy Jk of exchange coupling between the antiferromagnetic layer and the ferromagnetic layer can not be obtained. It is preferable that the lower limits of those impurity concentrations are as close to zero as possible. However, since it is practically impossible to realize zero, 1 atomic ppm is regulated as a general standard of the lower limit.

The ferromagnetic layer 40 is formed of a metal element such as Fe, Ni, Co, Mn, Cr, Dy, Er, Nd, Tb, Tm, Ce, Gd, alloy or compound containing the above metal element. Particularly, it is preferably formed of a composition expressed by $(Co_zNi_{1-z})_wFe_{1-w}$ ($0.4 \leq z \leq 1.0$, $0.5 \leq w \leq 1.0$ by weight). Out of the composition range as described above, no large electrical resistance change can be obtained.

The thickness of the ferromagnetic layer 40 as described above is set to 1.6 to 10 nm, and more preferably 2 to 6 nm. If this value is smaller than 1.6 nm, it loses the characteristic as the ferromagnetic layer. On the other hand, if the value exceeds 10 nm, the pinning force of the antiferromagnetic layer 50 is reduced, and thus the sufficient pinning effect of the spin of the ferromagnetic layer can not be obtained.

As described above, since the ferromagnetic layer 40 is in direct abutment with the antiferromagnetic layer 50, a direct interlayer interaction acts on each other after a heat treatment at a given temperature, and the rotation of the magnetization of the ferromagnetic layer 40 is prevented. On the other hand, with respect to the soft magnetic layer 20 as described later in detail, its magnetization can be freely rotated by a signal magnetic field from outside. As a result, a relative angle is produced in magnetization between the soft magnetic layer 20 and the ferromagnetic layer 40, so that a large MR effect due to the difference between the magnetization directions can be obtained.

The soft magnetic layer 20 is formed of Fe, Ni, Co or the like revealing soft magnetic characteristics, or alloy or compound containing these elements. The MR curve rises up more sharply by using the magnetic layer having a small coercive force Hc, and a favorable effect can be obtained. It is particularly preferable that the soft magnetic layer has the following two-layer structure. Specifically, the soft magnetic layer 20 is formed as a two-layer laminate body comprising, from the side of the non-magnetic layer 30, a first soft magnetic layer and a second soft magnetic layer. The first soft magnetic layer is made of a simple substance of Co (cobalt) or an alloy containing Co no less than 80 weight %. The second soft magnetic layer has a composition expressed by $(Ni_xFe_{1-x})_yCo_{1-y}$ ($0.7 \leq x \leq 0.9$, $0.5 \leq y \leq 1.0$ by weight). With this arrangement, the first soft magnetic layer with Co being rich works as a diffusion blocking layer so as to prevent diffusion of Ni from the side of the second soft magnetic layer toward the non-magnetic metal layer 30. Further, since the first soft magnetic layer with Co being rich enhances the scattering of electrons, the MR ratio is improved. The second soft magnetic layer is formed within the foregoing composition range for maintaining the soft magnetic characteristic.

The thickness of the soft magnetic layer 20 as described above is set to 2 to 15 nm, preferably 3 to 15 nm, and more preferably 5 to 15 nm. If this value is smaller than 2 nm, no excellent characteristic as the soft magnetic layer can be obtained. On the other hand, if the value exceeds 15 nm, the total thickness of the multilayered film is large and the resistance of the whole magnetic multilayered film is increased, so that the MR effect is reduced. When the soft magnetic layer 20 is in the form of the foregoing two-layer laminate body, it is sufficient to set the thickness of the Co-rich first soft magnetic layer to be no less than 0.4 nm.

In order to conduct electrons efficiently, a metal having conductivity is preferably used for the non-magnetic metal layer which is interposed between the soft magnetic layer 20 and the ferromagnetic layer 40. More specifically, it may be formed of at least one selected from Au, Ag and Cu, alloy containing 60 weight % or more of at least one of these elements, or the like.

The thickness of the non-magnetic metal layer 30 is preferably set to 1.5 to 4 nm. If this value is smaller than 1.5 nm, the soft magnetic layer 20 and the ferromagnetic layer 40 which are disposed through the non-magnetic metal layer are exchange-coupled to each other, so that the spins of the soft magnetic layer 20 and the ferromagnetic layer 40 do not function independently of each other. If this value exceeds 4 nm, the rate of the electrons which are scattered at the interface between the soft magnetic layer 20 and the ferromagnetic layer 40 disposed at the upper and lower sides respectively is reduced, so that the MR ratio is reduced.

The protective layer 80 is normally provided to prevent oxidation of the surface of the magnetic multilayered film in a film-forming process and improve wettability with ken electrode material formed thereon and adhesive strength. The protective layer 80 is formed of Ti, Ta, W, Cr, Hf, Zr, Zn or the like. The thickness thereof is generally set to about 3 to 30 nm.

The substrate 15 is formed of glass, silicon, MgO, GaAs, ferrite, AlTiC, $CaTiO_3$ or the like, and the thickness thereof is generally set to about 0.5 to 10 mm.

The under layer 17 is formed of Ta, Hf, Cr, Zr or the like. The thickness thereof is normally set to about 2 to 20 nm.

The material of each layer and the thickness thereof are specified as described above, and an external magnetic field is applied in a direction within the film surface as described later at the film formation time of at least the soft magnetic layer 20 to apply anisotropic magnetic field Hk of 2 to 200 e, preferably 2 to 160 e, and more preferably 2 to 100 e.

If the anisotropic magnetic field Hk of the soft magnetic layer is lower than 20 e, it is equal to the same degree of the coercive force, and no linear MR change curve can be substantially obtained in the vicinity of zero magnetic field, so that the characteristic as the MR element is deteriorated. On the other hand, if it is higher than 200 e, when this film is applied to the MR head or the like, the output is liable to be reduced and the resolution is reduced. The value Hk as described above can be obtained by applying the external magnetic field of 10 to 3000 e at the film formation. If the external magnetic field is no greater than 100 e, it is too insufficient to induce Hk. On the other hand, if it exceeds 3000 e, the effect is not improved although a coil must be designed in large size due to an occurrence of magnetic field. Therefore, the cost is increased and thus it is inefficient.

The magnetic multilayered film 1 may be repetitively laminated to form a magnetoresistance effect film. In this case, the repetitive lamination frequency n of the magnetic multilayered film is not limited to a specific value, and it may be suitably selected in accordance with a desired magnetoresistance ratio, etc. In order to satisfy the present requirement for ultrahigh densification of the magnetic recording, the smaller total film thickness of the magnetic multilayered film is better. However, if the film is thinner, the MR effect is usually reduced. The magnetic multilayered film of this invention can be used in practice to a sufficient level, even when the repetitive lamination frequency n is 1. Furthermore, as the lamination frequency is increased, the magnetoresistance ratio increases while productivity is lowered. If n is excessively large, the resistance of the whole element is excessively low, and it is practically inconvenient. Therefore, usually, n is preferably set to 10 or less. The preferable range of n is 1 to 5.

The film formation of each layer of the foregoing magnetic multilayered film 1 is preferably carried out by sputtering. Upon formation of the magnetic multilayered film 1, particularly, upon formation of the antiferromagnetic layer 50, an ultimate pressure in a vacuum film forming apparatus is set to $2\times10^{-9}$ Torr or less, preferably $8\times10^{-10}$ Torr or less, and more preferably $2\times10^{-10}$ Torr or less. The ultimate pressure is defined as a pressure in the film forming apparatus before the start of film formation, and differs from a pressure upon film formation.

The range of the ultimate pressure of no more than $2\times10^{-9}$ Torr is a range which has not been proposed in view of improving the film quality. For accomplishing the condition of the ultimate pressure of no more than $2\times10^{-9}$ Torr, what is not carried out in general is required with respect to a sputtering apparatus. Specifically, it is necessary that vacuum seal portions be all metal gaskets, that the apparatus be all formed of stainless steel or aluminum, that degassing be carried out at high temperature under vacuum upon assembling the apparatus, that, during the exhaust operation, the whole vacuum vessel be baked to high temperatures so as to thoroughly and forcibly discharge residual gas and $H_2O$, and that an exhaust pump operable under $2\times10^{-9}$ Torr or less be used.

For forming the antiferromagnetic layer 50, the concentration of oxygen contained in a target used in the sputtering is set to 1 to 600 atomic ppm, preferably 1 to 500 atomic ppm, and more preferably 1 to 300 atomic ppm. The oxygen concentration of the target is derived through analysis using the amount of $CO_2$ gas produced by burning a portion of the target. Further, the total concentration of impurities (for example, $H_2O$, $CO_2$ and He) in the sputtering gas introduced upon sputtering is set to 0.1 to 100 atomic ppb, preferably 0.1 to 50 atomic ppb, more preferably 0.1 to atomic ppb, and still more preferably 0.1 to 5 atomic ppb. Particularly, the $H_2O$ impurity concentration in the sputtering gas is liable to influence the film quality and is desired to be set to no more than 40 atomic ppb, preferably no more than 10 atomic ppb, and more preferably no more than 5 atomic ppb. An operating pressure in the vacuum film forming apparatus during actual film formation is normally set to $1\times10^{-4}$ to $1\times10^{-2}$ Torr.

It is preferable that the film formation of the respective layers of the magnetic multilayered film 1 in the present invention is carried out according to the foregoing film forming conditions for further improving the characteristic of the magnetoresistance effect film.

As the substrate 15, glass, silicon, MgO, GaAs, ferrite, AlTiC, $CaTiO_3$ or the like may be used. For the film formation, it is preferable that an external magnetic field of 10 to 3000 e is applied in one direction within the film plane at the film formation of the soft magnetic layer 20. With this operation, the anisotropic magnetic field Hk can be provided to the soft magnetic layer 20. The application of the external magnetic field may be performed at only the film formation time of the soft magnetic field, for example, using a device which is equipped with an electromagnet or the like which is capable of easily controlling an application timing of the magnetic field, and no external magnetic field is applied at the film formation time of the antiferromagnetic layer 50. Alternatively, a method of applying a constant magnetic field at the film formation time at all times may be used.

As described above, by applying the external magnetic field in one direction within the film plane at least upon film formation of the soft magnetic layer 20 to induce the anisotropic magnetic field Hk, the high frequency characteristic can be further improved.

Furthermore, when forming the antiferromagnetic layer 50, the magnetic field is preferably applied in a direction perpendicular to the direction of the magnetic field applied at the film formation time of the soft magnetic film 20. Specifically, it is applied within the film plane of the magnetic multilayered film and in a direction orthogonal to the measurement current. The magnitude of the applied magnetic field is preferably set in the range of 10 to 3000 e. With this orthogonalization process carried out in advance, by applying a heat treatment after the formation of the magnetoresistance effect film, the magnetization direction of the ferromagnetic layer 40 is surely fixed in the applied magnetic field direction (direction perpendicular to the measurement current) by the antiferromagnetic layer 50, whereby the magnetization of the ferromagnetic layer can be most reasonably set to be antiparallel to the magnetization of the soft magnetic layer whose direction can be freely changed by the signal magnetic field. However, this is not a necessary condition, and the direction of the magnetic field to be applied at the film formation time of the antiferromagnetic layer may be coincident with the direction of the magnetization of the magnetic field to be applied at the film formation time of the soft magnetic layer. At this time, it is preferable that the temperature is decreased while applying the magnetic field in a strip short-side direction (direction perpendicular to the direction of the applied magnetic field when the soft magnetic layer 20 is formed), when the heat treatment at 150 to 300° C., particularly about 200° C., is carried out in the process after the magnetic multilayered film is formed.

In the present invention, due to the material of the antiferromagnetic layer 50, the exchange coupling between the antiferromagnetic layer 50 and the ferromagnetic layer 40 is not generated upon completion of the formation of the magnetic multilayered film. Therefore, the heat treatment is required after the formation of the magnetic multilayered film for generating the exchange coupling. However, in the present invention, since the antiferromagnetization promote layer 19 made of a particular material is formed so as to abut the antiferromagnetic layer 50, the heat treatment temperature can be set quite lower than the conventional heat treatment temperature. For example, the exchange coupling of a desired magnitude is generated at the heat treatment temperature in the range of no higher than 250° C., particularly 220 to 250° C. Since the exchange coupling can be generated through the heat treatment at the relatively low temperature as described above, a heat damage exerted on the spin valve film itself is extremely small and thus deterioration of the MR ratio being an important film characteristic is extremely small.

Figure 4:
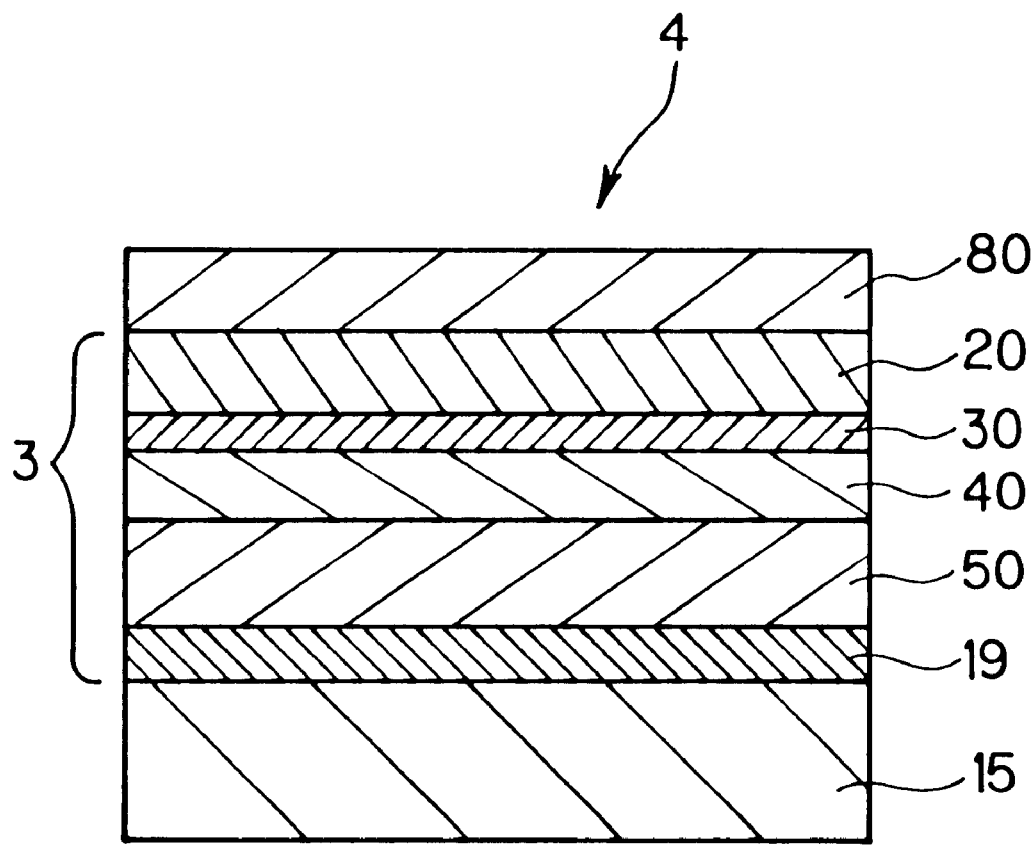
FIG. 4 is a sectional view of a magnetoresistance effect film showing another carrying-out mode of the present invention.

FIG. 4 shows a magnetoresistance effect film according to another carrying-out mode. In the drawing, the same reference numerals as the foregoing reference numerals represent the same constituent members. A magnetoresistance effect film 4 (magnetic multilayered film 3) shown in FIG. 4 differs from the foregoing magnetoresistance effect film 2 (magnetic multilayered film 1) shown in FIG. 1 in that the under layer 17 interposed between the substrate 15 and the antiferromagnetization promote layer 19 is omitted. In this case, since the thickness of the whole magnetoresistance effect film can be reduced, it is suitable for narrowing a gap of the MR head corresponding to the high density magnetic recording.

The magnetoresistance effect film having the magnetic multilayered film as described in each of the foregoing carrying-out modes is applied to a magnetoresistance effect type head (MR head), an MR sensor, a ferromagnetic memory element, an angle sensor or the like.

Hereinbelow, explanation will be given to an example where the magnetoresistance effect film 2 (FIG. 1) is applied to the magnetoresistance effect type head. As the magnetoresistance effect type head in the present invention, a spin valve head having a magnetic multilayered film revealing the giant magnetoresistance effect (GMR) may be cited as a preferred example.

Hereinbelow, the spin valve head will be picked up as the magnetoresistance effect type head (MR head) and given explanation.

Figure 5:
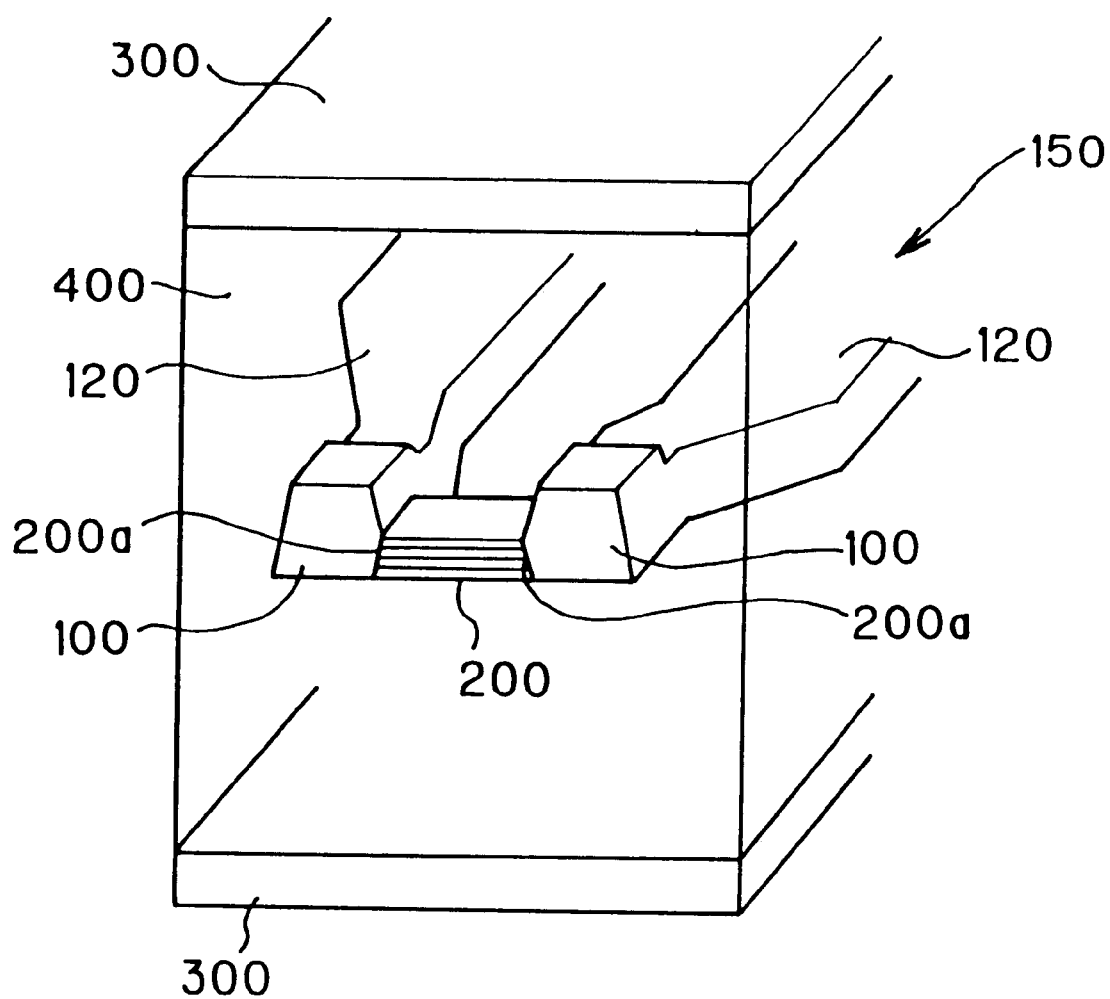
FIG. 5 is a schematic perspective view showing an example of a magnetoresistance effect type head according to the present invention.

As shown in FIG. 5, a magnetoresistance effect type head (MR head) 150 includes a magnetoresistance effect film 200 serving as a magnetically-sensitive portion for magnetically sensing a signal magnetic field, and electrode portions 100, 100 which are formed at both end portions 200a, 200a of the magnetoresistance effect film 200. Preferably, the whole both end portions 200a, 200a of the magnetoresistance effect film 200 serving as the magnetically-sensitive portion are connected to the electrode portions 100, 100. Conductive films 120, 120 are electrically conducted to the magnetoresistance effect film 200 through the electrode portions 100, 100. In this invention, the conductive film 120 and the electrode portion 100 are individually shown to simplify the description which will be made later, while in most cases the conductive film 120 and the electrode portion 100 are formed integral with each other by a thin film forming method. Accordingly, these elements may be considered as being formed of one member.

The magnetoresistance effect film 200 serving as the magnetically-sensitive portion of the MR head has substantially the same laminate structure as the magnetoresistance effect film 2 having the magnetic multilayered film 1 shown in FIG. 1. That is, the magnetoresistance effect film 200 is substantially replaced by the magnetoresistance effect film 2 having the magnetic multilayered film shown in FIG. 1, so that the magnetoresistance effect film 200 includes a non-magnetic metal layer 30, a ferromagnetic layer 40 formed on one surface of the non-magnetic metal layer 30, a soft magnetic layer 20 formed on the other surface of the non-magnetic metal layer 30, an antiferromagnetic layer 50 which is formed on a surface of the ferromagnetic layer 40 remote from the other surface thereof abutting the non-magnetic metal layer 30 so as to pin the direction of magnetization of the ferromagnetic layer 40, and an anti-ferromagnetization promote layer 19 which is formed on a surface of the antiferromagnetic layer 50 remote from the other surface thereof abutting the ferromagnetic layer 40.

The magnetoresistance effect film 200 exhibits the so-called spin-valve type magnetoresistance change. The spin-valve type magnetoresistance change represents that, in the magnetic multilayered film having the non-magnetic metal layer 30, the ferromagnetic layer 40 formed on one surface of the non-magnetic metal layer 30, the soft magnetic layer formed on the other surface of the non-magnetic metal layer 30 and the antiferromagnetic layer 50 formed on the ferromagnetic layer for pinning the magnetization direction of the ferromagnetic layer 40, an angle formed between the spin of the soft magnetic layer 20 and the spin of the pinned ferromagnetic layer 40 is set to approximately 90 degrees in an acute angle when the external signal magnetic field is zero. In practice, the angle may be 45 to 90 degrees, and most preferably 90 degrees (orthogonalization of magnetization) for causing the magnetoresistance effect curve (MR curve) to be asymmetrical relative to the plus and minus external magnetic fields with respect to the zero external magnetic field.

For achieving the orthogonalization of magnetization, it is necessary that the magnetic multilayered film 1 is subjected to a vacuum heat treatment in the magnetic field. This treatment is called an orthogonalization heat treatment, and a temperature during the treatment is called an orthogonalization temperature. In the orthogonalization heat treatment, it is preferable to change only the magnetization direction of the antiferromagnetic layer 50. Preferably, the orthogonalization temperature is lower than a temperature at which the induced magnetic anisotropy of the soft magnetic layer 20 is lost. If the orthogonalization heat treatment is carried out at a temperature higher than the temperature at which the induced magnetic anisotropy of the soft magnetic layer 20 is lost, the magnetization direction of the soft magnetic layer 20 is oriented in a magnetization easy axis direction relative to the external magnetic field so that the magnetoresistance effect curve relative to the external magnetic field is subjected to hysteresis to cause a problem in linearity. Simultaneously, the output is lowered. On the other hand, if it is too lower than the temperature at which the induced magnetic anisotropy of the soft magnetic layer 20 is lost, the exchange coupling magnetic field Hua is deteriorated due to heat applied during operation of an MR sensor in the magnetic recording system and during the spin valve head fabricating process so that the magnetic multilayered film can not work as a spin valve film.

In the present invention, since the antiferromagnetization promote layer 19 made of the particular material is formed so as to abut the antiferromagnetic layer 50 as described above, not only the (110) crystal surface orientation can be regulated at the given rate, but also the exchange coupling can be generated through the heat treatment at the relatively low temperature. Therefore, a heat damage exerted on the spin valve film itself is extremely small and thus deterioration of the MR ratio being an important film characteristic is extremely small.

As shown in FIG. 5, in the magnetoresistance effect type head (MR head) 150, shield layers 300, 300 are formed so as to sandwich the magnetoresistance effect film 200 and the electrode portions 100, 100 at the upper and lower sides, and a non-magnetic insulation layer 400 is formed at a portion between the magnetoresistance effect film 200 and the shield layers 300, 300.

The same materials and thicknesses as described in the foregoing carrying-out mode of the magnetic multilayered film are preferably used for the ferromagnetic layer 40, the non-magnetic metal layer 30, the soft magnetic layer 20, the antiferromagnetic layer 50 and the antiferromagnetization promote layer 19 used in the magnetoresistance effect film 200 as the magnetically-sensitive portion.

As shown in FIG. 5, the current-flowing electrode portions 100 are arranged so that both end portions 200a, 200a of the magnetoresistance effect film 200 are wholly contacted with the electrode portions 100 in the laminate direction of the magnetoresistance effect film 200. Then, the electrons intensively flow through the portion sandwiched between the soft magnetic layer 20 and the ferromagnetic layer 40. At this time, the electrons are magnetically scattered in accordance with the spin directions of the soft magnetic layer 20 and the ferromagnetic layer 40, so that the resistance is greatly varied. Accordingly, a fine change of the external magnetic field can be detected as a large change of electrical resistance.

Figure 6:
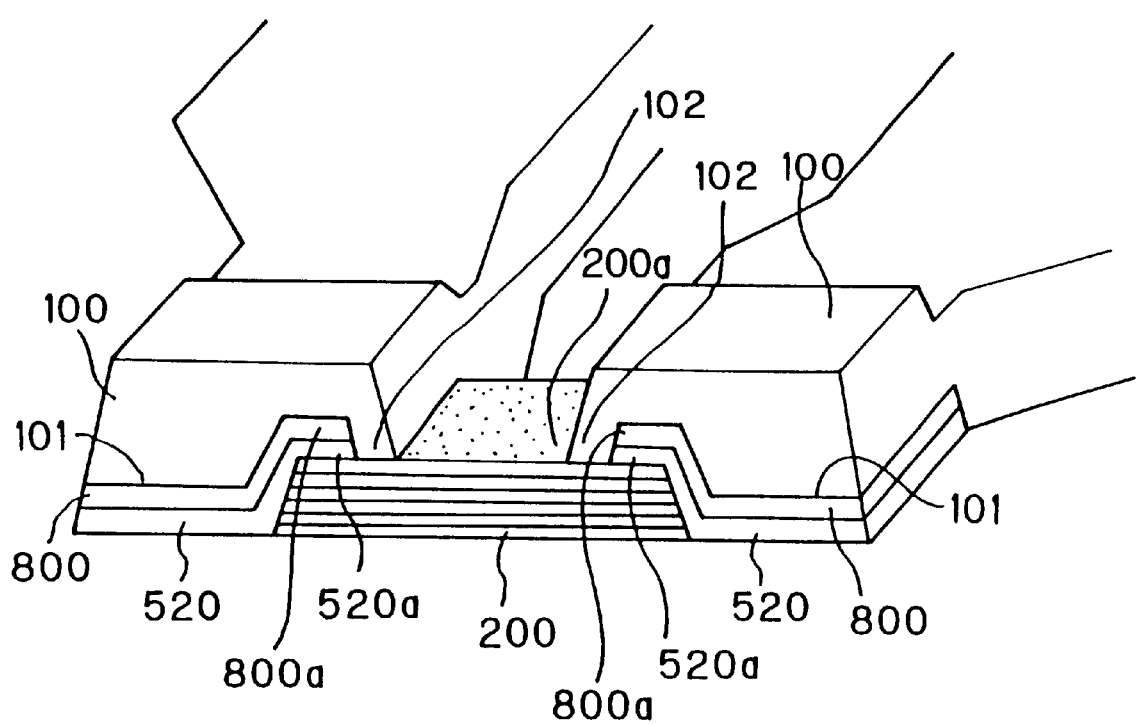
FIG. 6 is a schematic perspective view showing a preferred connection state between a magnetoresistance effect film and electrode portions of a magnetoresistance effect type head according to the present invention.

It is particularly preferable that the MR head having the spin valve film of the present invention has a head structure as shown in FIG. 6. Specifically, between the magnetoresistance effect film 200 working as a magnetically-sensitive portion and the electrode portions 100 for conducting the measurement current, linking soft magnetic layers 520 and antiferromagnetic layers 800 (or hard magnetic layer 800) are interposed in order from the side of the magnetoresistance effect film 200 as shown in the drawing. Further, the linking soft magnetic layer 520 and the antiferromagnetic layer 800 (or hard magnetic layer 800) are formed such that their one end side covers a portion of an upper side 200a (near the soft magnetic layer) of the magnetoresistance effect film 200 and their other end side gets under a lower surface 101 of the electrode portion 100 as shown in the drawing. Further, an end portion 102, located at the head center side, of the electrode portion 100 is formed so as to cover a portion of the upper side 200a (near the soft magnetic layer) of the magnetoresistance effect film 200 and also cover upper end portions 520a, 800a of the linking soft magnetic layer 520 and the antiferromagnetic layer 800, respectively. The linking soft magnetic layer 520 is about 10 nm in thickness and made of, for example, NiFe, NiFeCr, NiFeRh, NiFeRu, CoZrNb, FeAlSi and FeZrN. The antiferromagnetic layer 800 is about 50 nm in thickness and made of, for example, $Ru_5Rh_{15}Mn$, NiMn, FeMn, PtMn and $\alpha$-$Fe_2O_3$. The hard magnetic layer 800 is about 50 nm in thickness and made of, for example, CoPt and CoPtCr.

With such an arrangement, through effects of both the linking soft magnetic layers 520 and the antiferromagnetic layers 800 formed at the magnetoresistance effect film 200, the longitudinal bias can be given quite efficiently so that the MR head which can suppress the Barkhausen noises can be achieved. Further, since the end portions 102 of the electrode portions 100 are formed so as to cover the magnetoresistance effect film 200, the MR head can be provided wherein the signal magnetic field is not lowered at the end portions of the element, and further, the formation of narrow track width, such as no greater than 1 $\mu$m, is easy.

The invention of the foregoing magnetoresistance effect film and the invention of the magnetoresistance effect type head using such a magnetoresistance effect film will be explained in further detail based on the following concrete experimental examples:

EXAMPLE I

Samples were prepared using a DC magnetron sputtering apparatus. Specifically, each of the samples was prepared by stacking, on a glass substrate 15, an antiferromagnetization promote layer 19 (thickness and material are shown in Table 1), an antiferromagnetic layer 50 (PtMn group material; thickness and material are shown in Table 1) as a pinning layer, a ferromagnetic layer 40 (Co; 3 nm in thickness), a non-magnetic metal layer 30 (Cu; 2.5 nm in thickness), a soft magnetic layer 20 (NiFe; 9 nm in thickness/Co; 1 nm in thickness) and a protective layer 80 (Ta; 5 nm in thickness) in the order named. In PtMn, a two-component composition, of the antiferromagnetic layer 50, Mn=49 at %.

The samples were prepared with compositions of the antiferromagnetization promote layers using various materials shown in Table 1 below.

After preparation of the samples, a heat treatment was applied thereto in the magnetic field at 250° C. for 2 hours. After completion of the heat treatment, a magnetization curve of each sample was measured, and a magnitude of the exchange coupling energy between the antiferromagnetic layer and the ferromagnetic layer and the MR ratio were derived in the following manner.

Figure 10:
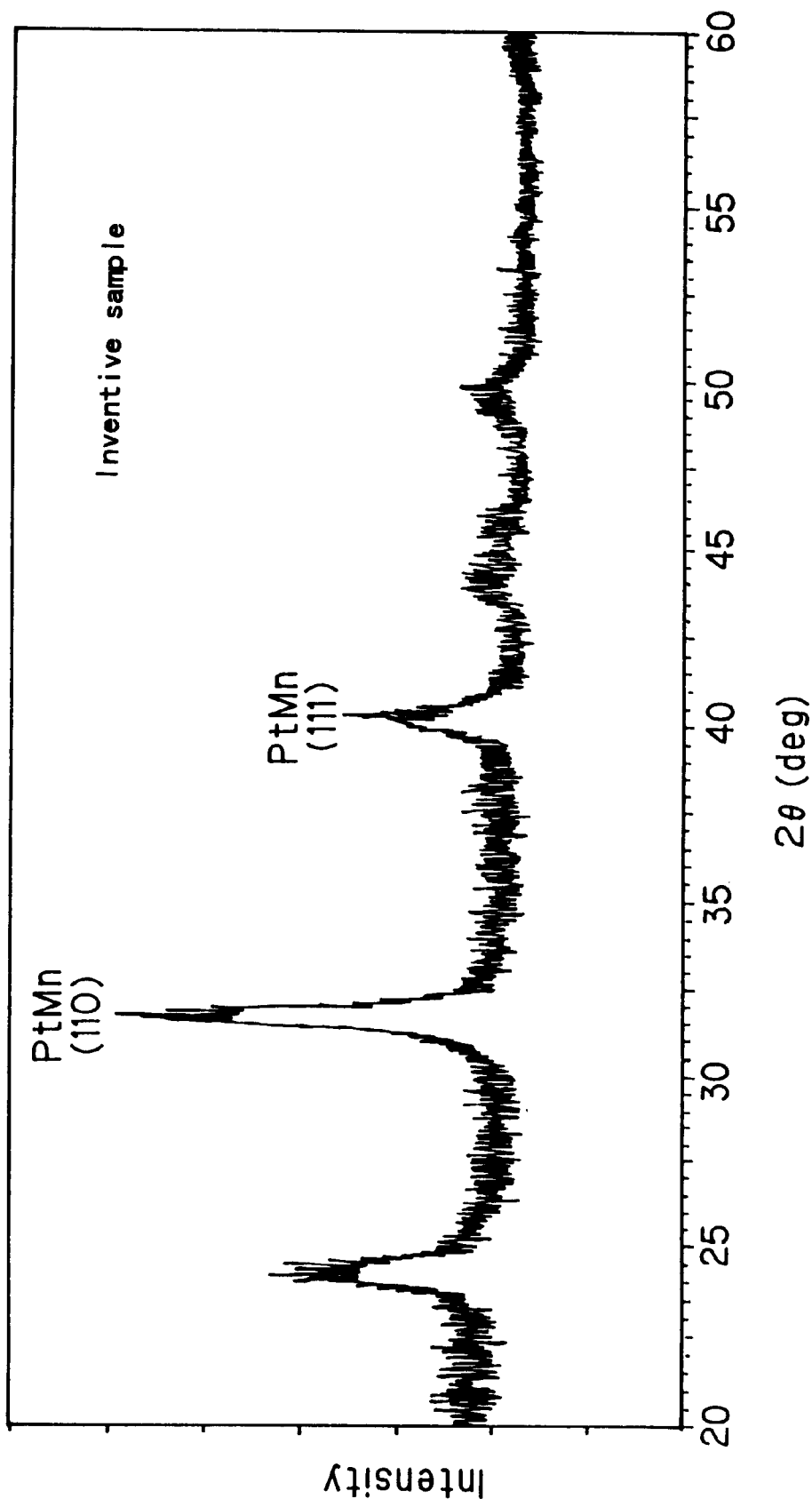
FIG. 10 is a graph showing an example of an X-ray diffraction profile measurement chart with respect to an inventive sample.
Figure 11:
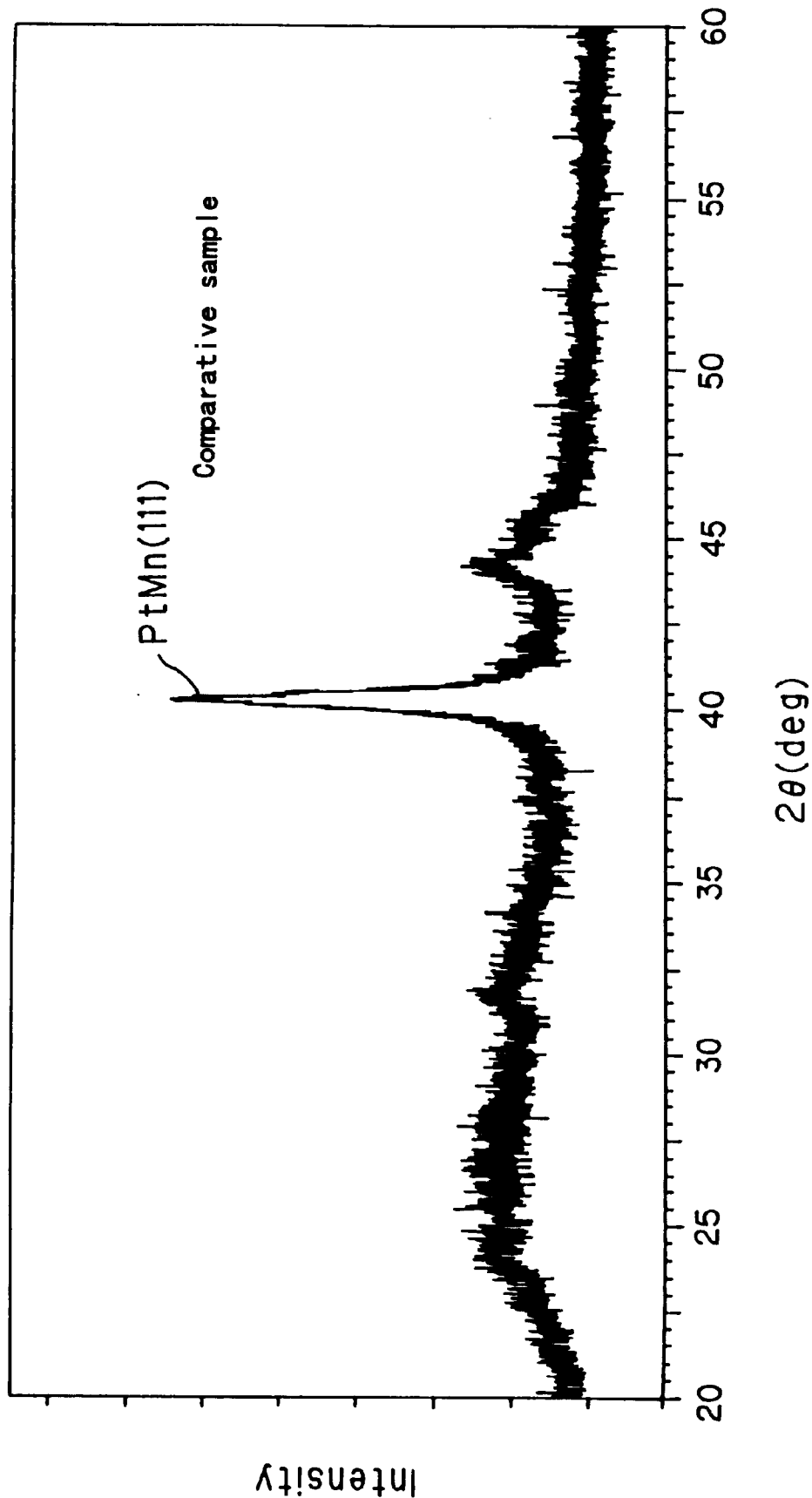
FIG. 11 is a graph showing an example of an X-ray diffraction profile measurement chart with respect to a comparative sample.

Further, with respect to each of antiferromagnetic layer samples made of group PtMn materials, a value of the ratio ($I_0/I_1$) between an X-ray diffraction intensity $I_0$ from (110) crystal surfaces on the film surface thereof and an X-ray diffraction intensity $I_1$ from (111) crystal surfaces on the film surface thereof was derived using an X-ray diffraction apparatus. As typical examples, FIG. 10 shows an X-ray diffraction chart of Inventive Sample No. 1–4, while FIG. 11 shows an X-ray diffraction chart of Comparative Sample No. 1–17. In Comparative Sample No. 1–17, no peak appears with respect to the (110) crystal surfaces, i.e. no crystals are oriented on the (110) surfaces.

Figure 7:
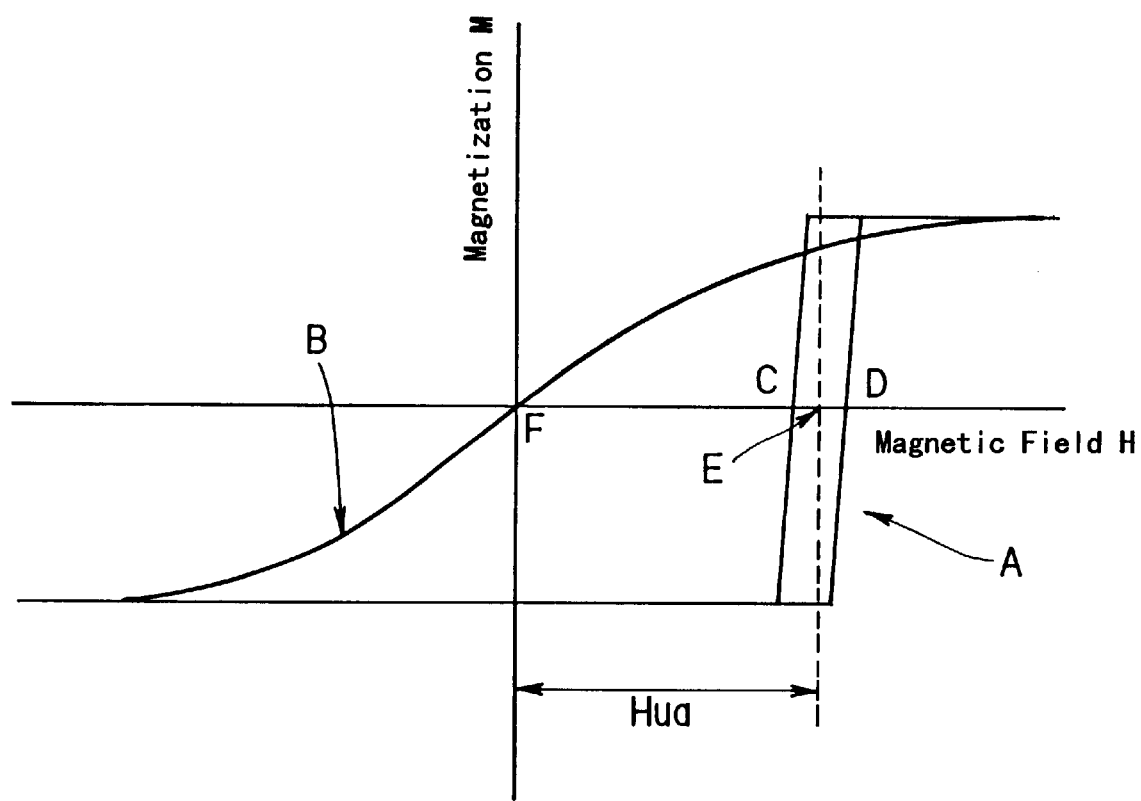
FIG. 7 is a diagram showing an M-H loop according to the present invention.

(1) Exchange Coupling Magnetic Field Hua due to Exchange Coupling and Exchange Coupling Energy Jk The exchange coupling magnetic field Hua is defined, for example, as a magnetic field at point E (middle point between point C and point D) shifting from the origin F in a magnetization curve shown in FIG. 7. In the drawing, a magnetization curve A represents a magnetization easy axis direction (direction in which the magnetic field was applied upon heat treatment), while a magnetization curve B represents a magnetization hard axis direction.

The exchange coupling energy Jk is derived by an equation Jk=Ms·Hua·d, wherein Ms represents a saturation magnetization of the ferromagnetic layer, and d represents a thickness of the ferromagnetic layer. Assuming that the ferromagnetic layers to be pinned are made of the same material and have the same thickness, the shift magnetic field Hua increases as a value of Jk increases so that an operation of the MR head becomes stable.

(2) MR Ratio

Measurement samples of 0.4×6 mm were prepared, and resistances were measured according to a four-terminal method while applying an external magnetic field in a direction perpendicular to the current within the film plane and changing it from −300 to 3000 e. The MR ratio ΔR/R was derived from the measured resistances. Specifically, the MR ratio ΔR/R was calculated using the following equation.

$$\Delta R/R = (\rho max - \rho sat) \times 100 / \rho sat (\%)$$

wherein ρmax represents the maximum resistivity and ρsat represents the minimum resistivity.

The results are shown in Table 1 below.

In each of the samples of Example I, the concentration of impurities contained in the antiferromagnetic layer was such that the oxygen concentration was 200 to 400 ppm, the carbon concentration was 80 to 200 ppm, the sulfur concentration was 80 to 300 ppm and the chlorine concentration was 50 to 100 ppm. The measurement of the concentration of impurities contained in the antiferromagnetic layer was carried out according to the following method.

Measuring Method of Concentration of Impurities Contained in Antiferromagnetic Layer Evaluation should be carried out relative to an antiferromagnetic layer having a thickness used in an actual head, which, however, exceeds the limit of analysis. Accordingly, an antiferromagnetic layer having a thickness of about 1 to 3 μm is formed under the same film forming condition and using the same film forming apparatus as those for forming an actual magnetoresistance effect film. In this case, for preventing influence from a side of the substrate, a proper buffer layer of metal is provided and, for preventing oxidation, a protective layer of other meal is provided as a top layer. Thereafter, quantitative analysis is carried out using a secondary ion mass spectroscopy (SIMS).

TABLE 1

| Sample No. | Antiferromagnetic Layer | | Antiferromagnetization promote layer | | $T_{an}/T_{pr}$ | $I_0/I_1$ | Jk (erg/cm$^2$) | MR ratio (%) |
|---|---|---|---|---|---|---|---|---|
| | Material | Thickness $T_{an}$ (nm) | Material | Thickness $T_{pr}$ (nm) | | | | |
| 1-1 | PtMn | 24 | W | 4 | 6 | 7 | 0.45 | 8.0 |
| 1-2 | PtMn | 24 | V | 4 | 6 | 3 | 0.37 | 7.5 |
| 1-3 | PtMn | 24 | Mo | 4 | 6 | 5 | 0.41 | 7.9 |
| 1-4 | PtMn | 24 | Ta | 4 | 6 | 3 | 0.32 | 6.5 |
| 1-5 | PtMn | 24 | Cr | 4 | 6 | 4 | 0.33 | 6.1 |
| 1-6 | PtMn | 24 | W | 4 | 6 | 6.5 | 0.42 | 7.9 |
| 1-7 | PtMn | 24 | W | 3.6 | 6.7 | 7 | 0.44 | 8.1 |
| 1-8 | PtMn | 24 | W | 3 | 8 | 7.2 | 0.45 | 8.2 |
| 1-9 | PtMn | 18 | W | 2 | 9 | 8 | 0.47 | 8.4 |
| 1-10 | PtMn | 15 | W | 1.5 | 10 | 8.2 | 0.48 | 8.5 |
| 1-11 | PtMn | 24 | W | 4 | 6 | 9 | 0.48 | 8.5 |
| 1-12 | PtMn | 20 | W | 3.3 | 6 | 1 | 0.38 | 7.8 |
| 1-13 (Comparative) | PtMn | 25 | Ta | 5 | 5 | 0.28 | 0.25 | 5.5 |
| 1-14 (Comparative) | PtMn | 18 | Ta | 4.5 | 4 | 0.23 | 0.20 | 5.7 |
| 1-15 (Comparative) | PtMn | 18 | Cr | 4.5 | 4 | 0.22 | 0.21 | 5.1 |
| 1-16 (Comparative) | PtMn | 18 | Hf | 3 | 6 | 0.27 | 0.24 | 5.6 |
| 1-17 (Comparative) | PtMn | 18 | Zr | 3 | 6 | 0.21 | 0.20 | 5.4 |
| 1-18 (Comparative) | PtMn | 18 | Ti | 3 | 6 | 0.19 | 0.20 | 5.0 |
| 1-19 | PtMn | 20 | V | 3 | 6.7 | 3.2 | 0.38 | 7.6 |
| 1-20 | PtMn | 20 | V | 5 | 8 | 3.8 | 0.40 | 7.7 |
| 1-21 | PtMn | 20 | V | 2 | 10 | 5 | 0.42 | 7.9 |
| 1-22 | PtMn | 20 | Mo | 3 | 6.7 | 5.3 | 0.42 | 7.9 |
| 1-23 | PtMn | 20 | Mo | 2.5 | 8 | 5.9 | 0.46 | 8.2 |
| 1-24 | PtMn | 20 | Mo | 2 | 10 | 7.3 | 0.48 | 8.5 |
| 1-25 | $Pt_{37}Pd_{11}Mn_{52}$ | 18 | W | 3 | 6 | 7.1 | 0.41 | 7.8 |
| 1-26 | $Pt_{37}Pd_{11}Mn_{52}$ | 18 | V | 3 | 6 | 3.3 | 0.32 | 7.5 |
| 1-27 | $Pt_{37}Pd_{11}Mn_{52}$ | 18 | Mo | 3 | 6 | 5.6 | 0.39 | 7.6 |
| 1-28 | $Pt_{37}Pd_{11}Mn_{52}$ | 18 | Ta | 3 | 6 | 3.2 | 0.30 | 6.4 |
| 1-29 | $Pt_{37}Pd_{11}Mn_{52}$ | 18 | Cr | 3 | 6 | 3.7 | 0.31 | 6.1 |
| 1-30 | $Pt_{38}Rh_{10}Mn_{52}$ | 18 | W | 3 | 6 | 7.2 | 0.43 | 7.9 |

TABLE 1-continued

| Sample No. | Antiferromagnetic Layer | | Antiferromagnetization promote layer | | $T_{an}/T_{pr}$ | $I_0/I_1$ | Jk (erg/cm²) | MR ratio (%) |
|---|---|---|---|---|---|---|---|---|
| | Material | Thickness $T_{an}$ (nm) | Material | Thickness $T_{pr}$ (nm) | | | | |
| 1-31 | $Pt_{38}Rh_{10}Mn_{52}$ | 18 | W | 2 | 9 | 8.5 | 0.47 | 8.2 |
| 1-32 | $Pt_{38}Rh_{10}Mn_{52}$ | 18 | V | 3 | 6 | 3.5 | 0.34 | 7.7 |
| 1-33 | $Pt_{38}Rh_{10}Mn_{52}$ | 18 | V | 2 | 9 | 5.0 | 0.38 | 7.8 |
| 1-34 | $Pt_{39}Ru_9Mn_{52}$ | 18 | Mo | 3 | 6 | 5.8 | 0.40 | 7.7 |
| 1-35 | $Pt_{39}Ru_9Mn_{52}$ | 18 | Mo | 2 | 9 | 7.2 | 0.45 | 7.9 |

From the results shown in Table 1, the effect of the present invention is apparent.

EXAMPLE II

Samples were prepared using a DC magnetron sputtering apparatus. Specifically, each of the samples was prepared by stacking, on a glass substrate 15, an antiferromagnetization promote layer 19 (thickness and material are shown in Table 2), an antiferromagnetic layer 50 (NiMn group material; thickness and material are shown in Table 2) as a pinning layer, a ferromagnetic layer 40 (Co; 10 nm in thickness), a non-magnetic metal layer 30 (Cu; 2.5 nm in thickness), a soft magnetic layer 20 (NiFe; 9 nm in thickness/Co; 1 nm in thickness) and a protective layer 80 (Ta; 5 nm in thickness) in the order named. In NiMn, a two-component composition, of the antiferromagnetic layer 50, Mn=55 at %.

The samples were prepared with compositions of the antiferromagnetization promote layers using various materials shown in Table 2 below.

After preparation of the samples, a heat treatment was applied thereto in the magnetic field at 250° C. for 2 hours. After completion of the heat treatment, a magnetization curve of each sample was measured, and a magnitude of the exchange coupling energy between the antiferromagnetic layer and the ferromagnetic layer, the MR ratio and a value of $I_0/I_1$ were derived in the same manner as in Example I.

The results are shown in Table 2 below.

TABLE 2

| Sample No. | Antiferromagnetic Layer | | Antiferromagnetization promote layer | | $T_{an}/T_{pr}$ | $I_0/I_1$ | Jk (erg/cm²) | MR ratio (%) |
|---|---|---|---|---|---|---|---|---|
| | Material | Thickness $T_{an}$ (nm) | Material | Thickness $T_{pr}$ (nm) | | | | |
| 2-1 | NiMn | 18 | W | 3 | 6 | 0.4 | 0.40 | 7.1 |
| 2-2 | NiMn | 18 | V | 3 | 6 | 1 | 0.50 | 7.5 |
| 2-3 | NiMn | 18 | Mo | 3 | 6 | 0.5 | 0.41 | 7.2 |
| 2-4 | NiMn | 24 | Ta | 4 | 6 | 0.4 | 0.33 | 6.4 |
| 2-5 | NiMn | 24 | Cr | 4 | 6 | 0.4 | 0.33 | 6.2 |
| 2-6 | NiMn | 24 | V | 4 | 6 | 1.2 | 0.51 | 7.5 |
| 2-7 | NiMn | 20 | V | 3 | 6.7 | 1.8 | 0.53 | 7.6 |
| 2-8 | NiMn | 20 | V | 2.8 | 7.1 | 2.2 | 0.54 | 7.6 |
| 2-9 | NiMn | 20 | V | 2.5 | 8 | 2.8 | 0.55 | 7.7 |
| 2-10 | NiMn | 20 | V | 2 | 10 | 3.5 | 0.58 | 7.8 |
| 2-11 | NiMn | 18 | V | 3 | 6 | 2 | 0.61 | 7.5 |
| 2-12 | NiMn | 18 | V | 3 | 6 | 0.1 | 0.40 | 6.9 |
| 2-13 (Comparative) | NiMn | 25 | Ta | 5 | 5 | 0.008 | 0.28 | 6.0 |
| 2-14 (Comparative) | NiMn | 18 | Ta | 4.5 | 4 | 0.005 | 0.24 | 6.1 |
| 2-15 (Comparative) | NiMn | 18 | Cr | 4.5 | 4 | 0.003 | 0.20 | 5.7 |
| 2-16 (Comparative) | NiMn | 18 | Hf | 3 | 6 | 0.007 | 0.25 | 5.8 |
| 2-17 (Comparative) | NiMn | 18 | Zr | 3 | 6 | 0.004 | 0.24 | 5.7 |
| 2-18 (Comparative) | NiMn | 18 | Ti | 3 | 6 | 0.001 | 0.20 | 5.7 |
| 2-19 | NiMn | 20 | W | 3 | 6.7 | 0.5 | 0.42 | 7.1 |
| 2-20 | NiMn | 20 | W | 2.5 | 8 | 0.6 | 0.43 | 7.1 |
| 2-21 | NiMn | 20 | W | 2 | 10 | 0.9 | 0.47 | 7.3 |
| 2-22 | NiMn | 20 | Mo | 3 | 6.7 | 0.51 | 0.42 | 7.2 |
| 2-23 | NiMn | 20 | Mo | 2.5 | 8 | 0.57 | 0.47 | 7.3 |
| 2-24 | NiMn | 20 | Mo | 2 | 10 | 0.62 | 0.50 | 7.4 |
| 2-25 | $Ni_{36}Pd_8Mn_{56}$ | 18 | W | 3 | 6 | 0.7 | 0.50 | 7.1 |
| 2-26 | $Ni_{36}Pd_8Mn_{56}$ | 18 | V | 3 | 6 | 1.5 | 0.52 | 7.3 |
| 2-27 | $Ni_{36}Pd_8Mn_{56}$ | 18 | Mo | 3 | 6 | 1.0 | 0.49 | 7.0 |
| 2-28 | $Ni_{36}Pd_8Mn_{56}$ | 18 | Cr | 3 | 6 | 1.1 | 0.43 | 6.6 |
| 2-29 | $Ni_{36}Pd_8Mn_{56}$ | 18 | Ta | 3 | 6 | 1.2 | 0.44 | 6.5 |
| 2-30 | $Ni_{38}Rh_7Mn_{55}$ | 18 | W | 3 | 6 | 0.8 | 0.51 | 7.2 |
| 2-31 | $Ni_{38}Rh_7Mn_{55}$ | 18 | W | 2 | 9 | 1.4 | 0.55 | 7.3 |
| 2-32 | $Ni_{38}Rh_7Mn_{55}$ | 18 | V | 3 | 6 | 0.9 | 0.49 | 7.1 |
| 2-33 | $Ni_{38}Rh_7Mn_{55}$ | 18 | V | 2 | 9 | 1.7 | 0.57 | 7.4 |
| 2-34 | $Ni_{37}Ru_9Mn_{54}$ | 18 | Mo | 3 | 6 | 0.7 | 0.48 | 7.0 |
| 2-35 | $Ni_{37}Ru_9Mn_{54}$ | 18 | Mo | 2 | 9 | 1.2 | 0.52 | 7.3 |

From the results shown in Table 2, the effect of the present invention is apparent.

EXAMPLE III

A spin valve (SV) type magnetoresistance effect type head was prepared as shown in FIG. 6.

First, a spin valve type magnetoresistance effect film was prepared. Specifically, the film sample was prepared by stacking, on a substrate 15 (AlTiC with $Al_2O_3$), an under layer 17 (Ta; 5 nm in thickness), an antiferromagnetization promote layer 19 (W; 3 nm in thickness), an antiferromagnetic layer 50 (PtMn; 18 nm in thickness) as a pinning layer, a ferromagnetic layer 40 (Co; 10 nm in thickness), a non-magnetic metal layer 30 (Cu; 2.5 nm in thickness), a soft magnetic layer 20 (NiFe; 7 nm in thickness) and a protective layer 80 (Ta; 5 nm in thickness) in the order named, so as to prepare the magnetoresistance effect type head.

In this magnetoresistance effect type head, an upper shield layer and a lower shield layer were formed via an $Al_2O_3$ gap film.

In this magnetoresistance effect type head, an MR head portion as shown in FIG. 6 was formed. Specifically, NiFe was formed to have a thickness of 10 nm as linking soft magnetic layers 520, and then, $Ru_5Rh_{15}Mn_{20}$ was formed on the linking soft magnetic layers 520 to have a thickness of 10 nm as antiferromagnetic layers 800. Thereafter, electrode portions 100 made of Ta were further formed on the antiferromagnetic layers 800 so that the spin valve (SV) type magnetoresistance effect type head was prepared as shown in FIG. 6. Subsequently, in vacuum of $10^{-7}$ Torr, the head was cooled from 220° C. while applying a magnetic field of 5000 e in an in-plane direction perpendicular to a measurement current direction, so as to induce the pinning effect for the ferromagnetic layer (heat treatment for exchange coupling).

A track width of the magnetoresistance effect type head was set to 2 μm, while a height of the MR element was set to 1 μm and a sense current was set to 4 mA.

Using this magnetoresistance effect type head, the output voltage was examined. As a result, the output voltage of 2000 mV was confirmed. This is a very large value which is about 2 times the conventional spin valve head.

EXAMPLE IV

Figure 8:
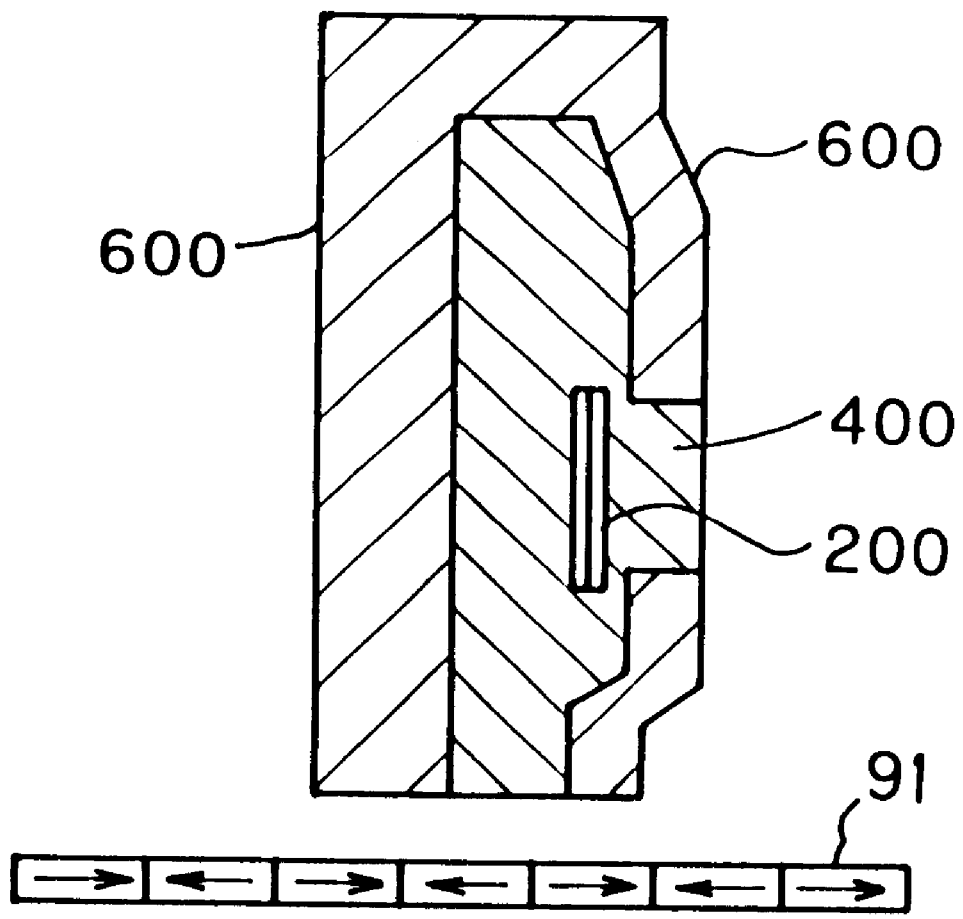
FIG. 8 is a partially omitted sectional view showing an example, wherein a magnetoresistance effect film (magnetic multilayered film) according to the present invention is applied to a yoke-type MR head.

FIG. 8 shows an example in which the magnetoresistance effect film of the present invention is applied to a yoke-type MR head. In this example, a cutout is formed at a portion of yokes 600, 600, and a magnetoresistance effect film 200 is formed therebetween via a thin insulation film 400. The magnetoresistance effect film 200 is provided with electrodes (not shown) for feeding a current in a direction parallel to or perpendicular to a magnetic path formed by the yokes 600, 600.

EXAMPLE V

Figure 9:
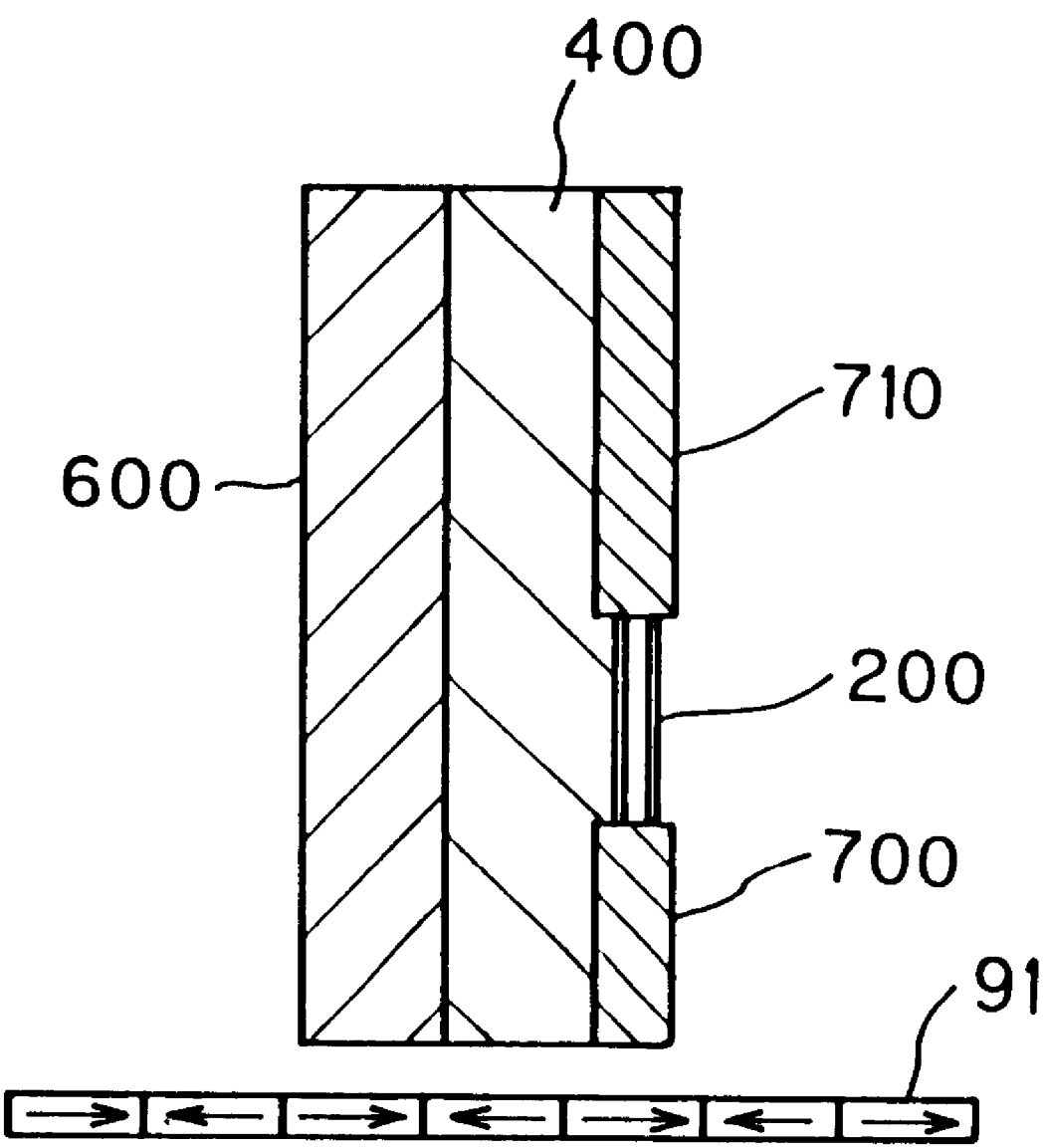
FIG. 9 is a partially omitted sectional view showing an example, wherein a magnetoresistance effect film (magnetic multilayered film) according to the present invention is applied to a flux guide type MR head.

FIG. 9 shows an example in which the magnetoresistance effect film of the present invention is applied to a flux guide type MR head. In this example, a magnetoresistance effect film 200 is magnetically coupled to flux guide layers 700 and 710 of high resistivity and high permeability. The flux guide layers 700 and 710 indirectly conduct a signal magnetic field to the magnetoresistance effect film 200. Further, via a non-magnetic insulation layer 400, a flux back guide layer 600 (escape path for magnetic flux passing the magnetoresistance effect film 200) is formed. Flux back guide layers 600 may be provided at both sides the magnetoresistance effect film 200 via the non-magnetic insulation layer 400. A feature of this head resides in that a magnetic field detecting portion thereof can approximate a recording medium in a nearly abutting fashion so that the high output can be obtained.

As appreciated from the foregoing results, the effect of the present invention is clear. Specifically, according to the present invention, a spin valve type magnetoresistance effect film comprises a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from the other surface thereof abutting the non-magnetic metal layer so as to pin a direction of magnetization of the ferromagnetic layer, and an antiferromagnetization promote layer formed on a surface of the antiferromagnetic layer remote from the other surface thereof abutting the ferromagnetic layer, wherein the antiferromagnetic layer is made of a compound containing Mn and having a CuAu-I type regular crystal structure, the antiferromagnetic layer has a characteristic requiring a heat treatment for generating exchange coupling relative to the ferromagnetic layer, and the antiferromagnetic layer after the heat treatment has a state wherein (110) crystal surfaces are oriented on a film surface of the antiferromagnetic layer.

Thus, there can be obtained the magnetoresistance effect film and the magnetoresistance effect type head which are large in exchange coupling energy between the ferromagnetic layer and the antiferromagnetic layer, large in MR ratio and highly excellent in spin valve film characteristic.

What is claimed is:

1. A spin valve magnetoresistance effect film which comprises a multilayered film comprising a non-magnetic metal layer, a ferromagnetic layer formed on one surface of the non-magnetic metal layer, a soft magnetic layer formed on the other surface of said non-magnetic metal layer, an antiferromagnetic layer which is formed on the surface of said ferromagnetic layer remote from the other surface thereof which abuts said non-magnetic metal layer so as to pin a direction of magnetization of said ferromagnetic layer, and an antiferromagnetization promote layer formed on the surface of said antiferromagnetic layer remote from the other surface thereof which abuts said ferromagnetic layer, wherein said antiferromagnetic layer comprises PtMn or NiMn and having a CuAu-I type regular crystal structure, and wherein said antiferromagnetic layer is heat treated for generating exchange coupling relative to said ferromagnetic layer, wherein said antiferromagnetic layer after heat treatment bas a state wherein (110) crystal surfaces are oriented on a film surface of said antiferromagnetic layer, and wherein a value of $I_0/I_1$ is set in the range of 1–10 for PtMn or 0.1–5 for NiMn, said $I_0$ representing an X-ray diffraction intensity exhibiting (110) crystal orientation surfaces on the film surface of said antiferromagnetic layer and said $I_1$ representing an X-ray diffraction intensity exhibiting (111) crystal orientation surfaces on the film surface of said antiferromagnetic layer.

2. The magnetoresistance effect film according to claim 1, wherein said antiferromagnetization promote layer is at least one metal selected from the group consisting of W, Mo, V, Cr and Ta.

3. The magnetoresistance effect film according to claim 1, wherein said antiferromagnetization promote layer is at least one metal selected from the group consisting of W, Mo and V.

4. The magnetoresistance effect film according to claim 1, wherein said antiferromagnetization promote layer is W.

5. The magnetoresistance effect film according to claim 1, wherein said antiferromagnetization promote layer is Mo.

6. The magnetoresistance effect film according to claim 1, wherein said antiferromagnetization promote layer is V.

7. The magnetoresistance effect film according to claim 1, wherein a laminate structure is formed in order; a substrate, an optional underlayer, antiferromagnetization promote layer, said antiferromagnetic layer, said ferromagnetic layer, said non-magnetic metal layer and said soft magnetic layer.

8. The magnetoresistance effect film according to claim 1, wherein said antiferromagnetic layer is heat treated at a temperature no higher than 250° C.

9. The magnetoresistance effect film according to claim 1, wherein said antiferromagnetic layer is heat treated at a temperature within the range of 220° C. to 250° C.

10. The magnetoresistance effect film according to claim 1, wherein said value of $I_0/I_1$ of said PtMn layer is set in the range of 5–10.

11. The magnetoresistance effect film according to claim 1, wherein said value of $I_0/I_1$ of said NiMn layer is set in the range of 0.4–5.

12. The magnetoresistance effect film according to claim 1, wherein said value of $I_0/I_1$ of said NiMn layer is set in the range of 1–5.

13. The magnetoresistance effect film according to claim 1, wherein said value of $I_0/I_1$, of said layer is set in the range of 3–10.

14. The magnetoresistance effect film according to claim 1, wherein said antiferromagnetic layer is $Pt_{x1}M_{y1}Mn_{z1}$, wherein M is at least one metal selected from the group consisting of Ru, Rh, Pd, Au, Ag, Fe and Cr, and wherein $30 \leq x1 \leq 60$, $0 \leq y130$, $40 \leq z2 \leq 60$, x1, y1 and z1 is atomic %, and wherein x1+y1+z1=100.

15. The magnetoresistance effect film according to claim 14, wherein said value of $I_0/I_1$ of said PtMn layer is set in the range of 5–10.

16. The magnetoresistance effect film according to claim 14, wherein said value of $I_0/I_1$, of said PtMn layer is set in the range of 3–10.

17. The magnetoresistance effect film according to claim 1 wherein said antiferromagnetic layer is $Ni_{x2}M_{y2}Mn_{z2}$ wherein M is at least one metal selected from the group consisting of Ru, Rh, Pd, Pt, Au, Ag, Fe and Cr, and wherein $30 \leq x2 \leq 60$, $0 \leq y2 \leq 30$, $40 \leq z2 \leq 60$, x2, y2 and z2 is atomic %, and wherein x2+y2+z2=100.

18. The magnetoresistance effect film according to claim 17, wherein said value of $I_0/I_1$ of said NiMn layer is set in the range of 0.4–5.

19. The magnetoresistance effect film according to claim 17, said value of $I_0/I_1$ of said NiMn layer is set in the range of 1–5.

20. The magnetoresistance effect film according to claim 1, wherein the thickness of said antiferromagnetic layer and the thickness of said antiferromagnetization promote layer are such that a value of Tan/Tpr is set in the range of 6 to 12, said Tan representing the thickness of said antiferromagnetic layer and said Tpr representing the thickness of said antiferromagnetization promote layer.

21. The magnetoresistance effect film according to claim 20, wherein said value of Tan/Tpr is set in the range of 7 to 12.

22. The magnetoresistance effect film according to claim 20, wherein said value of Tan/Tpr is set in the range of 8 to 12.

23. The magnetoresistance effect film according to claim 20, wherein said Tan is set in the range of 5 to 30 nm.

24. The magnetoresistance effect film according to claim 23, wherein said value of Tan is set in the range of 5 to 20 nm.

25. A magnetoresistance effect head comprising a magnetoresistance effect film conductive films and electrode portions,
wherein said conductive films are conductively connected to said magnetoresistance effect film through said electrode potions,
wherein said magnetoresistance effect film is a spin valve type magnetoresistance effect film which comprises a multilayered film comprising a non-magnetic metal layer, a ferromagnetic layer formed on one surface of the non-magnetic metal layer, a soft magnetic layer formed on the other surface of said non-magnetic metal layer, an antiferromagnetic layer which is formed on the surface of said ferromagnetic layer remote from the other surface thereof which abuts said non-magnetic metal layer so as to pin a direction of magnetization of said ferromagnetic layer, and an antiferromagnetization promotelayer formed on the surface of said antiferromagnetic layer remote from the other surface thereof which abuts said ferromagnetic layer, and wherein said antiferromagnetic layer comprises PtMn or NiMn and having a CuAu-I type regular crystal structure, wherein said antiferromagnetic layer is heat treated for generating exchange coupling relative to said ferromagnetic layer, and wherein said antiferromagnetic layer after heat treatment has a state wherein (110) crystal surfaces are oriented on a film surface of said antiferromagnetic layer, and
wherein a value of $I_0/I_1$ is set in the range of 1–10 for PtMn or 0.1–5 for NiMn said $I_0$ representing an X-ray diffraction intensity exhibiting (110) crystal orientation surfaces on the film surface of said antiferromagnetic layer and said $I_1$ representing an X-ray diffraction intensity exhibiting (111) crystal orientation surfaces on the film surface of said antiferromagnetic layer.

26. The magnetoresistance effect head according to claim 25, wherein said antiferromagnetization promote layer is at least one metal selected from the group consisting of W, Mo, V, Cr and Ta.

27. The magnetoresistance effect head according to claim 25, wherein said antiferromagnetization promote layer is at least one metal selected from the group consisting of W, Mo and V.

28. The magnetoresistance effect head according to claim 25, wherein said antiferromagnetization promote layer is W.

29. The magnetoresistance effect head according to claim 25, wherein said antiferromagnetization promote layer is Mo.

30. The magnetoresistance effect head according to claim 25, wherein said antiferromagnetization promote layer is V.

31. The magnetoresistance effect head according to claim 25, wherein said magnetoresistance effect film comprises a laminate structure formed in order; a substrate, an optional underlayer, antiferromagnetization promote layer, said antiferromagnetic layer, said ferromagnetic layer, said non-magnetic metal layer and said soft magnetic layer.

32. The magnetoresistance effect head according to claim 25, wherein said antiferromagnetic layer is heat treated at a temperature no higher than 250° C.

33. The magnetoresistance effect head according to claim 25, wherein said antiferromagnetic layer is heat treated at a temperature within the range of 220° C. to 250° C.

34. The magnetoresistance effect head according to claim 25, wherein said value of $I_0/I_1$ of said PtMn layer is set in the range of 5–10.

35. The magnetoresistance effect type head according to claim 25, wherein said value of $I_0/I_1$ of said NiMn layer is set in the range of 0.4–5.

36. The magnetoresistance effect head according to claim 25, wherein said value of $I_0/I_1$ of said NiMn layer is set in the range of 1–5.

37. The magnetoresistance effect head of claim 25, wherein said value of $I_0/I_1$ of said PtMn layer is set in the range of 3–10.

38. The magnetoresistance effect head according to claim 25, wherein said antiferromagnetic layer is $Pt_{x1}M_{y1}Mn_{z1}$, wherein M is at least on metal selected from the group consisting of RT, Rh, Pd, Au, Ag, Fe and Cr, and wherein $30 \leq x1 \leq 60$, $0 \leq y1 \leq 30$, $40 \leq z1 \leq 60$, x1, y1 and z1 is atomic %, and wherein x1+y1+z1=100.

39. The magnetoresistance effect head according to claim 38, wherein said value of $I_0/I_1$ of said PtMn layer is set in the range of 5–10.

40. The magnetoresistance effect head of claim 38, wherein said value of $I_0/I_1$ of said PtMn layer is set in the rage of 3–10.

41. The magnetoresistance effect head according to claim 25, wherein said antiferromagnetic layer is $Ni_{x2}M_{y2}Mn_{z2}$, wherein M is at least one metal selected from tie group consisting of Ru, Rh, Pd, Pt, Au, Ag, Fe and Cr, and wherein $30 \leq x2 \leq 60$, $0 \leq y2 \leq 30$, $40 \leq z2 \leq 60$, x2, y2 and z2 is atomic %, and wherein x2+y2+z2=100.

42. The magnetoresistance effect head according to claim 41, wherein said value of $I_0/I_1$ of said NiMn layer is set in the range of 0.4–5.

43. The magnetoresistance effect head according to claim 41, wherein said value of $I_0/I_1$ of said NiMn layer is set in the range of 1–5.

44. The magnetoresistance effect head according to claim 25, wherein the thickness of said antiferromagnetic layer and the thickness of said antiferromagnetization promote layer are such that a value of Tan/Tpr is set in the range of 6 to 12, said Tan representing the thickness of said antiferromagnetic layer and said Tpr representing the thickness of said antiferromagnetization promote layer.

45. The magnetoresistance effect head according to claim 44, wherein said value of Tan/Tpr is set in the range of 7 to 12.

46. The magnetoresistance effect head according to claim 44, wherein said value of Tan/Tpr is set in the range of 8 to 12.

47. The magnetoresistance effect head according to claim 44, wherein said Tan is set in the range of 5 to 30 nm.

48. The magnetoresistance effect head according to claim 47, wherein said value of Tan is set in the range of 5 to 20 nm.

* * * * *